US012776342B2

(12) United States Patent
Hara

(10) Patent No.: US 12,776,342 B2
(45) Date of Patent: Oct. 27, 2026

(54) MAGNETIC DISK DEVICE AND METHOD

(71) Applicants: Kabushiki Kaisha Toshiba, Tokyo (JP); Toshiba Electronic Devices & Storage Corporation, Tokyo (JP)

(72) Inventor: Takeyori Hara, Kawasaki Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/242,760

(22) Filed: Jun. 18, 2025

(65) Prior Publication Data

US 2026/0290391 A1 Sep. 24, 2026

(30) Foreign Application Priority Data

Mar. 19, 2025 (JP) ................................ 2025-045808

(51) Int. Cl.
*G11B 5/596* (2006.01)

(52) U.S. Cl.
CPC ...... *G11B 5/59627* (2013.01); *G11B 5/59688* (2013.01)

(58) Field of Classification Search
None
See application file for complete search history.

(56) References Cited

U.S. PATENT DOCUMENTS 5,675,498 A * 10/1997 White .................... H04L 27/38 702/66
5,764,705 A * 6/1998 White ................ H04L 27/3854 329/304
8,964,325 B1 * 2/2015 Yamada ............ G11B 5/59627 360/75
9,230,584 B1 * 1/2016 Kosugi ............. G11B 5/59688
9,520,149 B1 * 12/2016 Ding ................. G11B 5/59627
9,799,360 B2 10/2017 Tagami
9,953,672 B1 * 4/2018 Szita .................... G11B 5/5547
10,475,478 B2 * 11/2019 Tagami ............. G11B 5/59688
10,748,569 B1 8/2020 Ogawa et al.
10,854,238 B2 12/2020 Tagami et al.
11,127,426 B2 9/2021 Tagami
2015/0146318 A1 * 5/2015 Yamada .............. G11B 5/4886 360/29
2017/0185454 A1 * 6/2017 Xu ........................ G06F 9/5011
2020/0090691 A1 * 3/2020 Tagami ............. G11B 5/59655

* cited by examiner

*Primary Examiner* — Fred Tzeng
(74) *Attorney, Agent, or Firm* — Kim & Stewart LLP

(57) ABSTRACT

According to one embodiment, a controller performs processing when a magnetic head passes over a servo region. The processing includes acquiring a first burst demodulated signal by demodulating a first burst pattern, and acquiring a second burst demodulated signal by demodulating a second burst pattern. The processing includes interpolating a first correction value for a first demodulation position based on first correction values acquired from a first radial position and a second radial position. The processing includes interpolating a second correction value for the first demodulation position based on second correction values acquired from the first radial position and the second radial position. The processing includes correcting amplitude of the first burst demodulated signal by using the first interpolation correction value, and correct amplitude of the second burst demodulated signal by using the second interpolation correction value.

10 Claims, 29 Drawing Sheets

MAGNETIC DISK DEVICE AND METHOD

CROSS-REFERENCE TO RELATED APPLICATIONS

This application is based upon and claims the benefit of priority from Japanese Patent Application No. 2025-045808, filed on Mar. 19, 2025; the entire contents of which are incorporated herein by reference.

FIELD

Embodiments described herein relate generally to a magnetic disk device and a method.

BACKGROUND

Conventionally, a repeatable runout (RRO) is known as one component of a positioning error of a magnetic head in a magnetic disk device. In the manufacturing process of the magnetic disk device, correction values (hereinafter, each referred to as an RRO correction value) are measured at radial positions to correct the positional deviation due to the RRO. The obtained RRO correction value are stored in a nonvolatile storage area as additional information of a servo-pattern configuration. When the magnetic disk device is used, the position of the magnetic head is corrected by using the RRO correction values.

DETAILED DESCRIPTION

According to the present embodiment, a magnetic disk device includes a magnetic disk, a magnetic head, and a controller. The magnetic disk includes tracks. The magnetic disk is provided with a radial servo region in which servo data including a first burst pattern and a second burst pattern is recorded. The magnetic head is configured to execute write and read on the magnetic disk. The controller is configured to acquire, for each of a first radial position and a second radial position, a first correction value and a second correction value. The first radial position is a position that is radially offset from a track center of the track. The second radial position is a position that is radially offset from the track center and is different from the first radial position. The controller is configured to perform processing when the magnetic head passes over the servo region. The processing includes acquiring a first burst demodulated signal by demodulating the first burst pattern, and acquiring a second burst demodulated signal by demodulating the second burst pattern. The processing includes calculating a first demodulation position of the magnetic head based on amplitude of the first burst demodulated signal and amplitude of the second burst demodulated signal. The processing includes acquiring a first interpolation correction value by calculation of interpolating a first correction value for the first demodulation position based on the first correction values acquired from the first radial position and the second radial position. The processing includes acquiring a second interpolation correction value by calculation of interpolating a second correction value for the first demodulation position based on the second correction values acquired from the first radial position and the second radial position. The processing includes correcting the amplitude of the first burst demodulated signal by using the first interpolation correction value, and correcting the amplitude of the second burst demodulated signal by using the second interpolation correction value. The processing includes calculating a second demodulation position of the magnetic head based on corrected amplitude of the first burst demodulated signal and corrected amplitude of the second burst demodulated signal. The processing includes performing positioning control using the second demodulation position.

Hereinafter, the magnetic disk device and the method according to the embodiment will be described in detail with reference to the accompanying drawings. Note that the present invention is not limited by the following embodiment.

Embodiment

Figure 1:
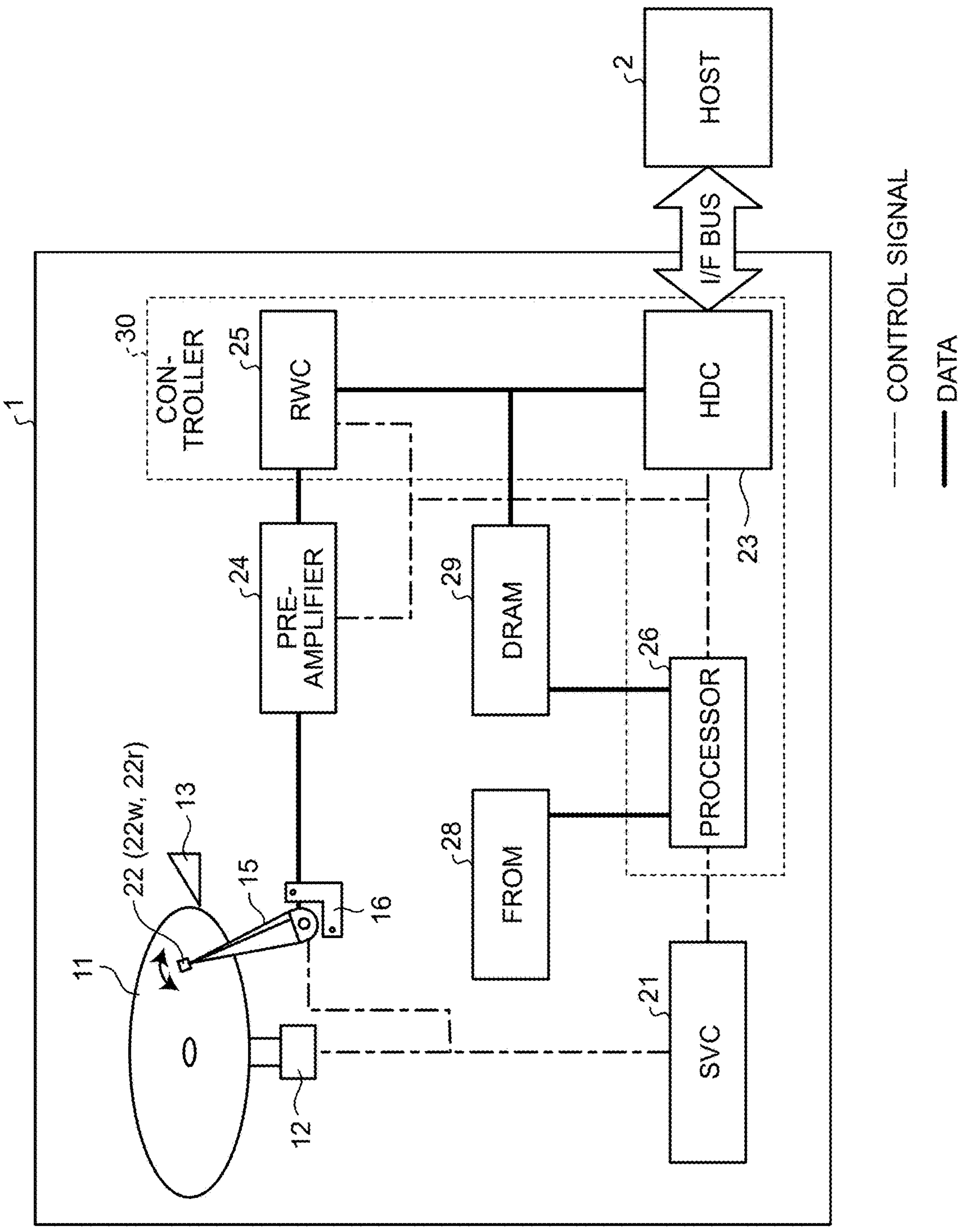
FIG. 1 is a schematic diagram illustrating an example of a configuration of a magnetic disk device according to an embodiment.

FIG. 1 is a schematic diagram illustrating an example of a configuration of a magnetic disk device 1 according to the embodiment.

The magnetic disk device 1 is connected to a host 2. The magnetic disk device 1 can receive an access command such as a write command or a read command from the host 2.

The magnetic disk device 1 includes a magnetic disk 11 having a magnetic layer formed on a surface thereof. The magnetic disk device 1 accesses the magnetic disk 11 in response to the access command. The access includes a write of data and a read of data.

The write and read of data is performed by a magnetic head 22. Specifically, in addition to the magnetic disk 11, the magnetic disk device 1 includes a spindle motor (SPM) 12, a ramp 13, an actuator arm 15, a voice coil motor (VCM) 16, a servo controller (SVC) 21, the magnetic head 22, a hard disk controller (HDC) 23, a preamplifier 24, a read/write channel (RWC) 25, a processor 26, a flash read only memory (FROM) 28, and a dynamic random access memory (DRAM) 29.

The magnetic disk 11 is rotated at a predetermined rotation speed by the SPM 12 attached coaxially.

The SVC 21 is an integrated circuit having a function as a driver that drives the SPM 12 and the VCM 16. The processor 26 controls the rotation of the SPM 12 and the rotation of the VCM 16 via the SVC 21.

The magnetic head 22 performs writes and reads on the magnetic disk 11 by a write head **22*w* and a read head 22*r* provided therein. In addition, the magnetic head 22 is attached to a distal end of the actuator arm 15. The magnetic head 22 is moved in the radial direction of the magnetic disk 11 by the VCM 16 driven by the SVC 21. Note that one or both of the write head 22*w* and the read head 22*r* included in the magnetic head 22 may be provided for a single magnetic head 22**.

For example, when the rotation of the magnetic disk 11 is stopped, the magnetic head 22 is moved onto the ramp 13. The ramp 13 is configured to hold the magnetic head 22 at a position spaced apart from the magnetic disk 11.

The preamplifier 24 is an integrated circuit performing writes and reads of data via the magnetic head 22. The preamplifier 24 amplifies and outputs a signal read from the magnetic disk 11 by the magnetic head 22 during the read operation, and supplies the signal to the RWC 25. In addition, the preamplifier 24 amplifies a signal corresponding to the data to be written supplied from the RWC 25 during the write operation, and supplies the signal to the magnetic head 22.

The HDC 23 controls transmission and reception of data with the host 2 via the I/F bus, controls the DRAM 29, and the like.

The DRAM 29 is used as a buffer for data to be transmitted to and received from the host 2. For example, the DRAM 29 is used for temporarily storing data to be written or data read from the magnetic disk 11.

In addition, the DRAM 29 is used as an operation memory by the processor 26. The DRAM 29 is used as an area in which a firmware program is loaded and an area in which various types of management data are temporarily stored.

The RWC 25 modulates data to be written supplied from the HDC 23 and supplies the modulated data to the preamplifier 24. In addition, the RWC 25 performs demodulation including error correction on the signal read from the magnetic disk 11 and supplied from the preamplifier 24, and then outputs the signal to the HDC 23 as digital data.

The processor 26 is, for example, a central processing unit (CPU). A flash read only memory (FROM) 28 and a DRAM 29 are connected to the processor 26.

The FROM 28 stores a firmware program, various setting information, and the like. Note that the firmware program may be stored in the magnetic disk 11.

The processor 26 performs overall control of the magnetic disk device 1 according to a firmware program stored in the FROM 28 or the magnetic disk 11. For example, the processor 26 loads a firmware program from the FROM 28 or the magnetic disk 11 to the DRAM 29, and executes control of the SVC 21, the preamplifier 24, the RWC 25, the HDC 23, and the like according to the firmware program loaded to the DRAM 29.

Part or all of the functions of the processor 26 may be implemented by a hardware circuit such as a field-programmable gate array (FPGA) or an application specific integrated circuit (ASIC).

The HDC 23, the RWC 25, and the processor 26 may be considered as the controller 30. The controller 30 is configured as a system-on-a-chip (SoC) that is one integrated circuit. In addition to these components, the controller 30 may include other components (for example, the FROM 28, the DRAM 29, or the like). The controller 30 may include a plurality of chips.

Figure 2:
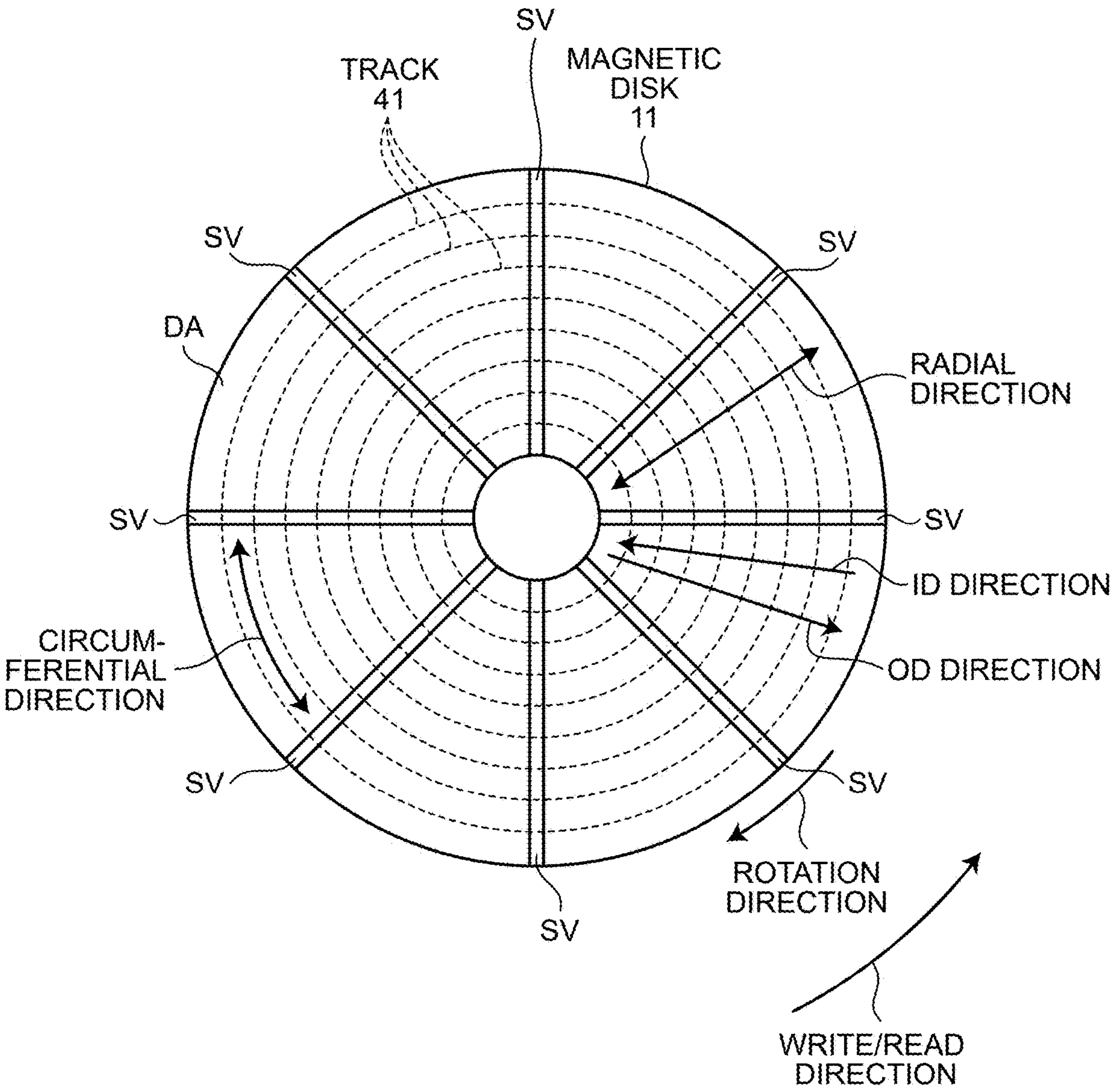
FIG. 2 is a schematic diagram illustrating an example of a configuration of a magnetic disk according to the embodiment.

FIG. 2 is a schematic diagram illustrating an example of a configuration of the magnetic disk 11 according to the embodiment. Note that this drawing illustrates an example of the rotation direction of the magnetic disk 11. The magnetic head 22 moves relative to the magnetic disk 11 by the rotation of the magnetic disk 11. Therefore, the write/read direction, namely, the direction in which data is written or read by the magnetic head 22 along the circumferential direction is opposite to the rotation direction of the magnetic disk 11.

In the radial direction, a direction from the edge to the center of the magnetic disk 11 is an inner diameter (ID) direction, and a direction from the center to the edge of the magnetic disk 11 is an outer diameter (OD) direction.

A servo-pattern configuration used for positioning of the magnetic head 22 is written to the magnetic disk 11 by, for example, a servo writer or self-servo write (SSW) in a manufacturing process. According to FIG. 2, as one example of the arrangement of the servo regions in which the servo-pattern configuration is written, servo regions SV are arranged radially in the radial direction and at predetermined intervals in the circumferential direction. A data region DA in which data is written is provided between two servo regions SV consecutive in the circumferential direction.

The servo-pattern configuration written in the servo region SV is used for positioning control of the magnetic head 22. The positioning control includes a seek operation which is an operation of moving the magnetic head 22 in the radial direction toward the target radial position, a tracking operation of maintaining the magnetic head 22 at the target radial position, and the like.

Concentric tracks 41 are provided in the radial direction of the magnetic disk 11. Hereinafter, a region divided by the servo region SV on the track 41 may be referred to as a servo sector SV.

Figure 3:
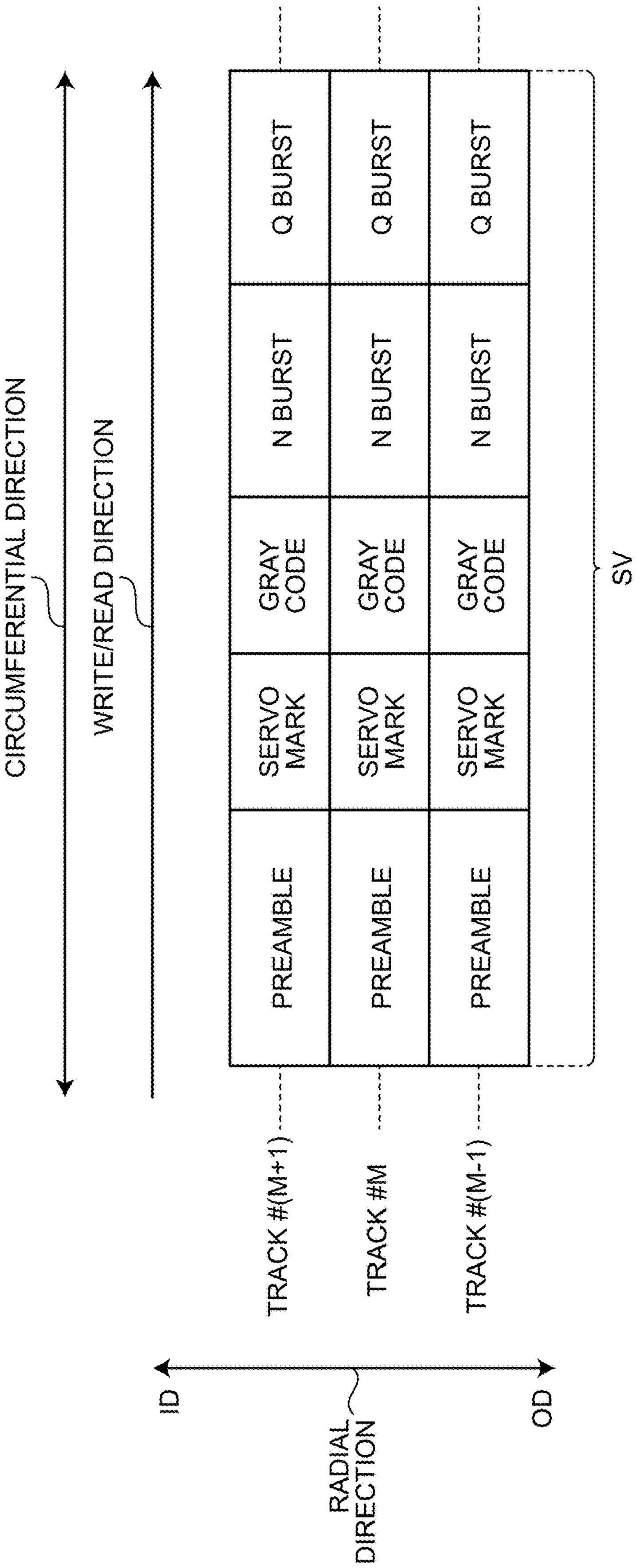
FIG. 3 is a diagram illustrating an example of a servo-pattern configuration recorded in a servo sector according to the embodiment.

FIG. 3 is a diagram illustrating an example of the servo-pattern configuration recorded in the servo sector SV according to the embodiment. Each track 41 is given a track number. Here, it is assumed that track numbers are given to the tracks 41 in ascending order from the outer diameter side to the inner diameter side. Then, hereinafter, the track 41 having the track number X (X is an integer number) is referred to as a track #X.

FIG. 3 illustrates the configuration of the servo sectors SV of the three tracks #(M−1), #M, and #(M+1). As illustrated in the drawing, a preamble, a servo mark, a gray code, an N burst, and a Q burst are recorded in the servo sector SV in this order in the write/read direction.

The preamble is pattern data of a single period that periodically changes in the circumferential direction. The preamble is used for adjusting the amplitude, phase, and frequency of the sampling data when the servo waveform read by the read head **22*r* is taken into the RWC 25** as the sampling data based on the servo clock.

The servo mark is pattern data for determining the demodulation timing of the servo-pattern configuration. Based on the servo mark detection timing, the controller 30 determines the demodulation timing of various servo-pattern configurations read by the read head **22*r*** thereafter.

The gray code includes a cylinder address for identifying each track 41 provided in the magnetic disk 11 and a sector address for identifying each servo sector SV on the track 41.

The N burst and the Q burst are pattern data used for detecting the amount of positional deviation of the track 41 from the track center indicated by the cylinder address included in the gray code. The amount of positional deviation of the track 41 from the track center is referred to as a burst offset.

Figure 4:
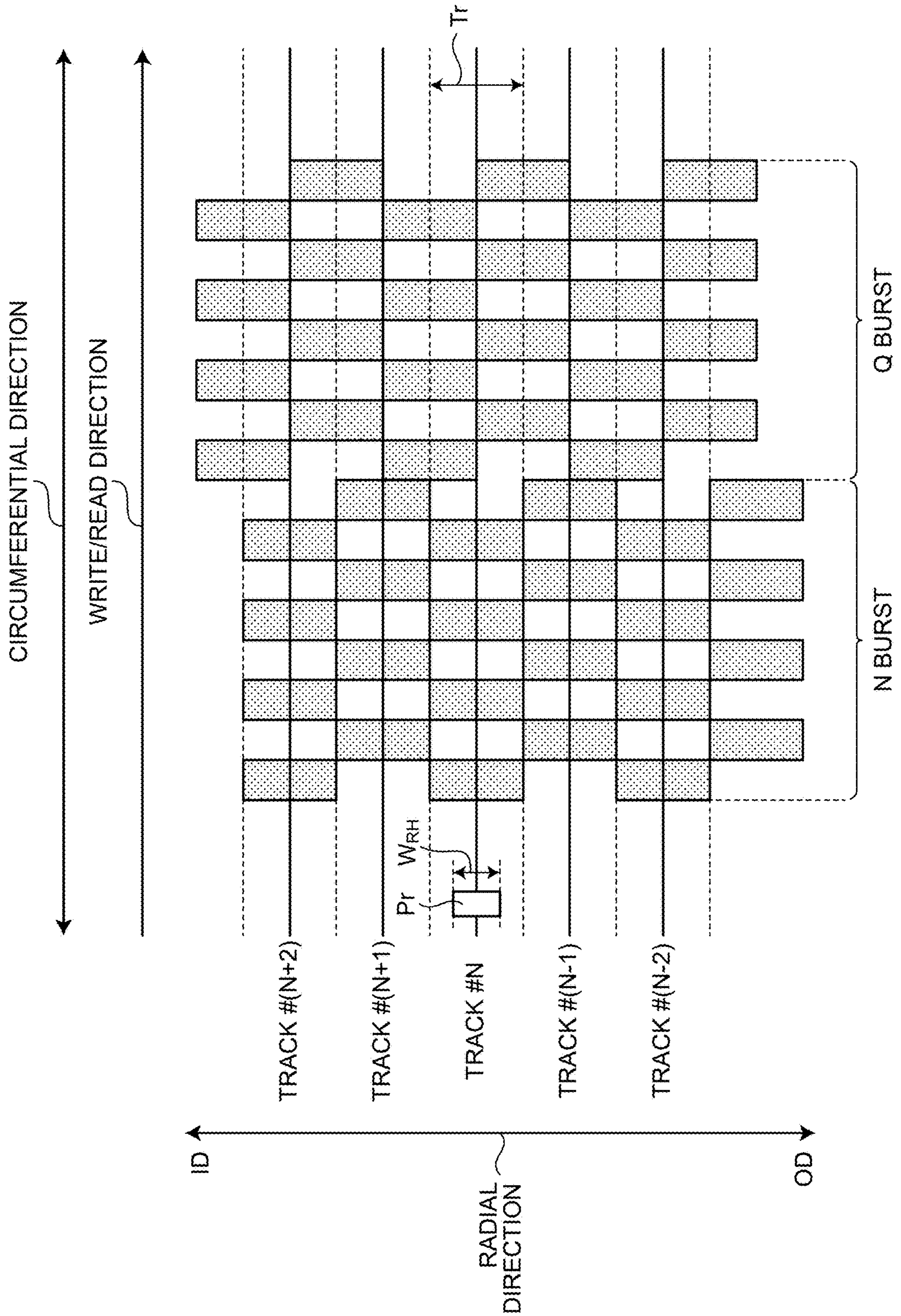
FIG. 4 is a schematic diagram illustrating an example (ideal example) of configurations of an N burst and a Q burst recorded in the servo sector according to the embodiment.

FIG. 4 is a schematic diagram illustrating an example of configurations of an N burst and a Q burst recorded in the servo sector SV according to the embodiment. In the figure, the configurations of the N burst and the Q burst of five tracks #(N−2), #(N−1), #N, #(N+1), and #(N+2) are illustrated. The dot-hatched pattern indicates one of two values having different polarities (for example, positive magnetization), and the white pattern indicates the other of the two values (for example, negative magnetization).

The length in the radial direction may be expressed in units of tracks, in other words, in units of spatial lengths in which the track pitch is regarded as 1. The unit of the spatial length in which the track pitch is regarded as 1 is denoted as Tr.

In the example illustrated in FIG. 4, each of the N burst and the Q burst has a configuration in which the polarity is inverted at predetermined length intervals in the circumferential direction. In the radial direction, the polarity of each of the N burst and the Q burst is reversed for every 1 Tr. The N burst is recorded such that the maximum amplitude is obtained at a position offset by 0.5 Tr from the track center. In addition, the Q burst is recorded so as to obtain the maximum amplitude at the track center.

The RWC 25 demodulates burst patterns (that is, patterns of N burst and Q burst). Then, the RWC 25 acquires an N-burst demodulated signal obtained by demodulating the N burst and a Q-burst demodulated signal obtained by demodulating the Q burst.

Note that FIG. 4 illustrates two burst patterns of ideal quality without distortion. Hereinafter, the example in which the two burst patterns illustrated in this drawing are recorded on the magnetic disk 11 may be referred to as an ideal example.

Figure 5:
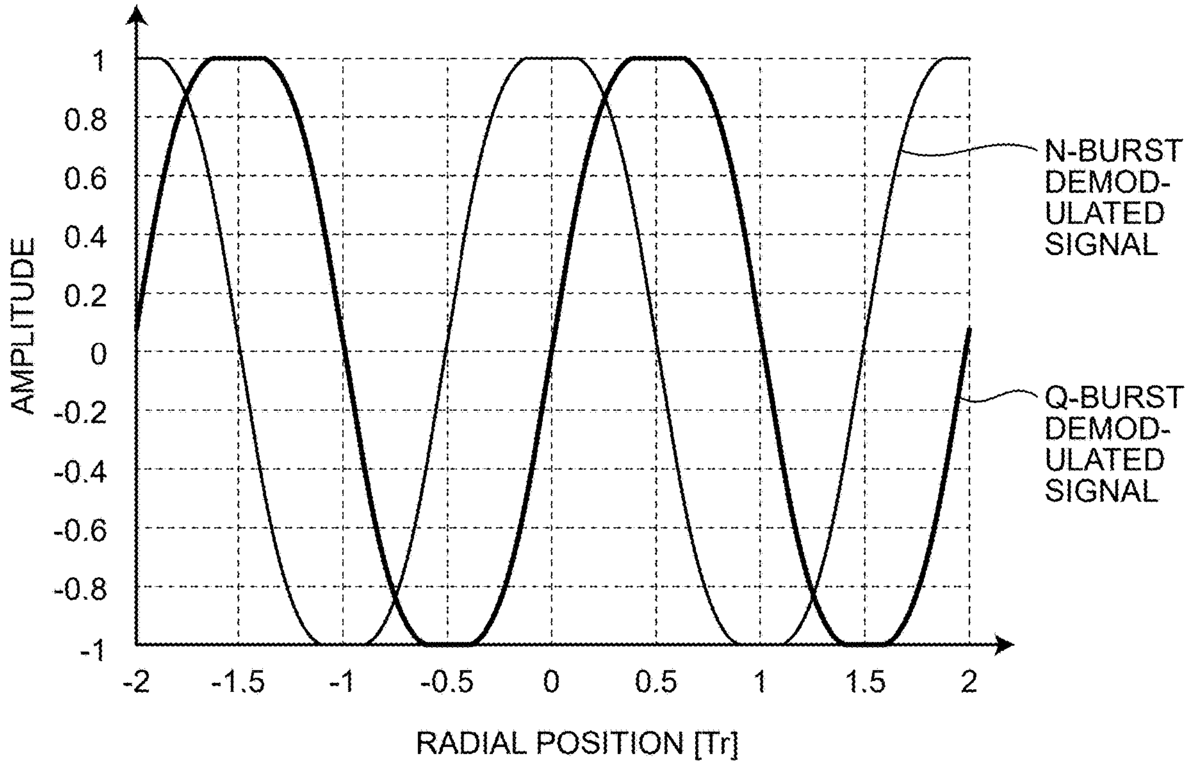
FIG. 5 is a diagram illustrating an example of the relationship between the amplitude of each of the N-burst demodulated signal and the Q-burst demodulated signal and the radial position of the magnetic head.

FIG. 5 is a diagram illustrating an example of the relationship between the amplitude of each of the N-burst demodulated signal and the Q-burst demodulated signal, and the radial position of the magnetic head 22 according to the ideal example.

In FIG. 5, the horizontal axis indicates a radial position with the track center of a certain track 41 (here, track #N in FIG. 4 as one example) as an origin. The radial position is expressed in units of tracks. Not limited to the description of this drawing, in the specification, as one example, the radial position is indicated with the outer diameter direction as a negative direction and the inner diameter direction as a positive direction. The vertical axis indicates the amplitude.

As illustrated in FIG. 5, the amplitude of the N-burst demodulated signal becomes the maximum value at the origin and changes in a substantially sinusoidal waveform having a cycle of 2 Tr with respect to the radial position. The amplitude of the Q-burst demodulated signal becomes the maximum value at a radial position offset by +0.5 Tr from the origin, and changes in a substantially sinusoidal waveform having a cycle of 2 Tr with respect to the radial position. Therefore, when 2 Tr is converted to 360° (degree), the phase difference between the amplitude of the N-burst demodulated signal and the amplitude of the Q-burst demodulated signal is 90° (degree).

When the amplitude of the N-burst demodulated signal and the amplitude of the Q-burst demodulated signal are shown in a plane as values of coordinate axes different from each other, a Lissajous figure is obtained. Hereinafter, a coordinate system in which the amplitude of the N-burst demodulated signal and the amplitude of the Q-burst demodulated signal are indicated as values of coordinate axes different from each other is referred to as a phase plane.

Figure 6:
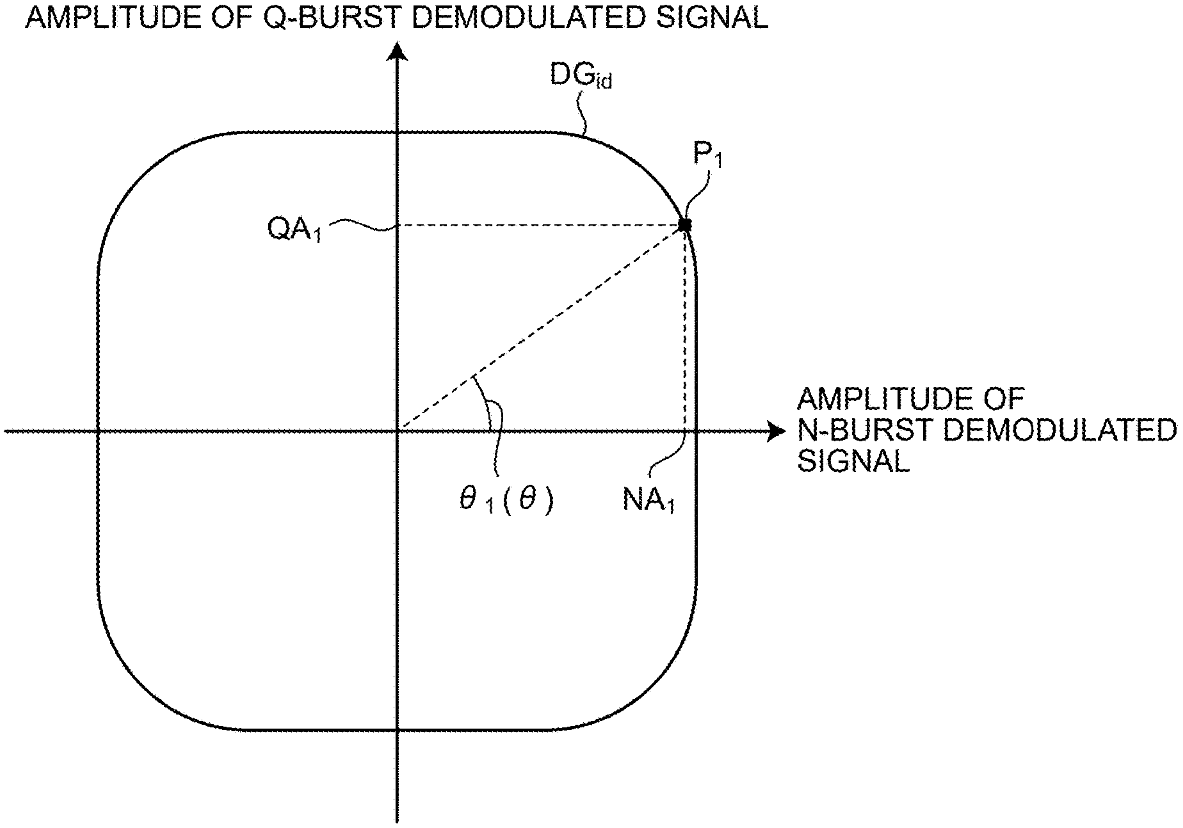
FIG. 6 is a diagram illustrating an example of a Lissajous figure.

FIG. 6 is a diagram illustrating an example of the Lissajous figure. In the example illustrated in the drawing, the phase plane is a coordinate system in which the horizontal axis indicates the amplitude of the N-burst demodulated signal and the vertical axis indicates the amplitude of the Q-burst demodulated signal.

In the ideal example, when a plurality of sets of the amplitude of the N-burst demodulated signal and the amplitude of the Q-burst demodulated signal obtained at different radial positions are plotted in the phase space, a Lissajous figure $DG_{id}$ is obtained. In the phase plane, an angle θ formed by the vector from the origin toward one point on the Lissajous figure $DG_{id}$ and the horizontal axis corresponds to the burst offset.

For example, in a case where the amplitude of the N-burst demodulated signal is $NA_1$ and the amplitude of the Q-burst demodulated signal is $QA_1$ when a certain magnetic head 22 passes over the servo sector SV at a certain radial position, the pair of $NA_1$ and $QA_1$ is located at the point $P_1$ in the Lissajous figure $DG_{id}$. An angle $\theta_1$ (degree) formed by the vector from the origin toward the point $P_1$ and the horizontal axis can be converted into the burst offset Ofs (Tr) by, for example, the following Formula (1).

$$Ofs=\theta_1/360\times 2 \quad (1)$$

The angle $\theta_1$ is obtained by calculation of the following Formula (2). In Formula (2), arctan is an arc tangent operator.

$$\theta_1=\arctan(QA_1/NA_1) \quad (2)$$

The controller 30 (for example, the RWC 25) acquires the amplitude of the N-burst demodulated signal from the N-burst demodulated signal obtained when the magnetic head 22 (more precisely, the read head **22*r*) passes over the region where the N burst is recorded. The controller 30 (for example, the processor 26) acquires the amplitude of the Q-burst demodulated signal from the Q-burst demodulated signal obtained when the magnetic head 22 (more precisely, the RWC 25) passes over the region where the Q burst is recorded. Then, the controller 30 (for example, the processor 26**) acquires the burst offset by performing the calculation of Formula (2) and the calculation of Formula (1) based on the amplitude of the N-burst demodulated signal and the amplitude of the Q-burst demodulated signal.

Figure 7:
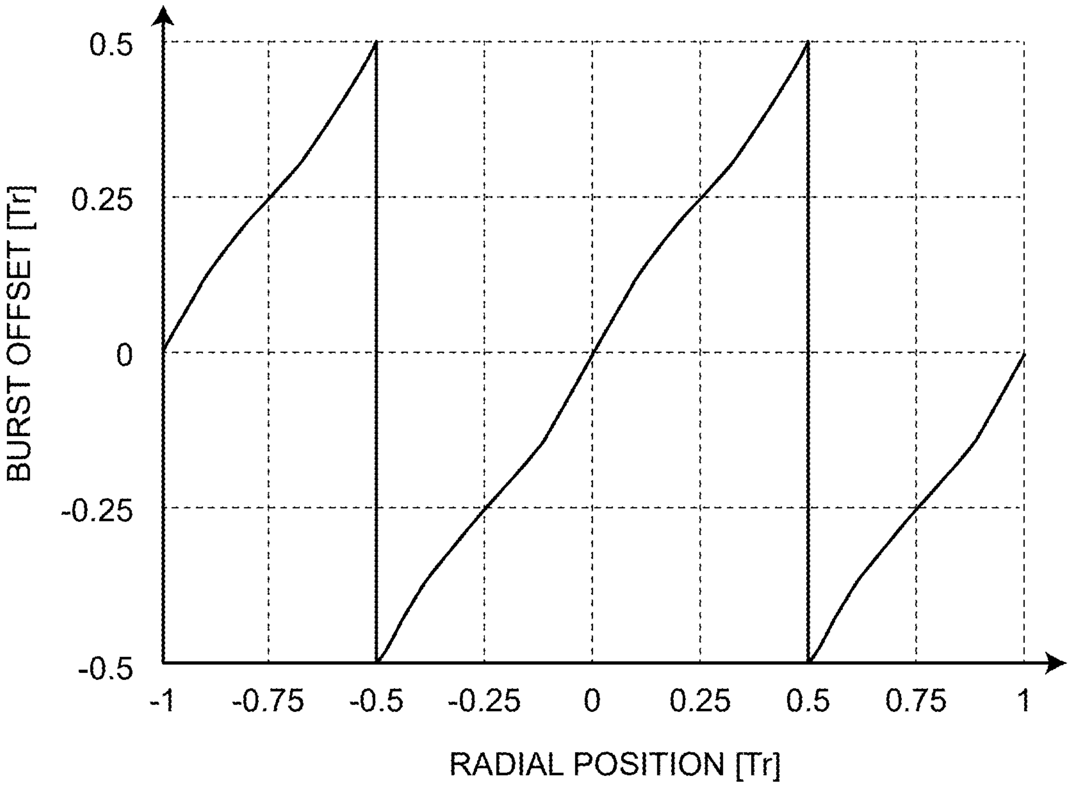
FIG. 7 is a diagram for describing a burst offset obtained by calculation by the controller according to the embodiment.

FIG. 7 is a diagram for describing a burst offset obtained by the calculation of Formula (2) and the calculation of Formula (1) by the controller 30 according to the embodiment. The horizontal axis indicates the radial position. The vertical axis indicates the burst offset obtained by calculation. Both the radial position and the burst offset are expressed in units of tracks. In the drawing, calculated values of the burst offset according to the ideal example is illustrated.

When acquiring the burst offset, the controller 30 (for example, the processor 26) calculates the radial position of the magnetic head 22 based on the cylinder address and the burst offset. The radial position of the magnetic head 22 obtained by the calculation is referred to as a demodulation position.

Note that as illustrated in FIG. 5, each of the amplitude of the N-burst demodulated signal and the amplitude of the Q-burst demodulated signal changes in a sinusoidal waveform slightly distorted according to the radial position of the magnetic head 22 even if the quality of the N burst and Q burst is ideal. There are some reasons why these changes in amplitude are distorted from the sinusoidal waveform.

The first reason is that the radial width of the read head **22*r* is narrower than the width of the positive or negative magnetization pattern. For example, an object Pr illustrated in FIG. 4 indicates the shape of the read head 22*r* when the read head 22*r* is located on the track #N. As illustrated in this figure, the radial width $W_{RH}$ of the read head 22*r* is narrower than the width of one pattern of positive or negative magnetization (that is, 1 Tr). Therefore, at the radial position, there is a range in which the amplitude of the burst demodulated signal does not change even when the radial position of the read head 22*r* changes. Due to the presence of the range, the amplitude of each burst demodulated signal according to the radial position of the magnetic head 22** is distorted from the shape of the sine wave.

The second reason is that the sensitivity of the read head **22*r* is not uniform on the element surface of the read head 22*r*. The sensitivity is high at the center of the element surface of the read head 22*r*, and the sensitivity decreases toward the end of the element surface of the read head 22*r*. Therefore, the amplitude of each burst demodulated signal according to the radial position of the magnetic head 22** is distorted from the shape of the sine wave.

When the amplitude of each burst demodulated signal changes sinusoidally, the Lissajous figure becomes a fine circle. However, since the amplitude of each burst demodulated signal changes with a sinusoidal waveform slightly distorted according to the radial position of the magnetic head 22, the Lissajous figure $DG_{id}$ is distorted from a circle and has a shape close to a rectangle as illustrated in FIG. 6.

The controller 30 may perform various calculations in addition to the calculations described with reference to FIGS. 5 to 7. For example, the controller 30 can perform processing called non-linear correction based on the N-burst demodulated signal and the Q-burst demodulated signal, calculate a moving speed in the radial direction when the magnetic head 22 moves in the radial direction, and the like. Description of these processes is omitted in the present specification.

The shape of the track 41 is ideally a perfect circle. However, the track 41 is distorted due to vibration received at the time of write of the servo-pattern configuration, recording quality of the servo pattern configuration, and the like. In other words, the radial position of the track 41, which is determined based on the combination of the cylinder address and the burst offset, may deviate from the radial position of the track 41 having an ideal perfect circle shape. Since this positional deviation is repeatedly generated in the same manner with one rotation of the magnetic disk 11 (and the SPM 12) as a cycle, it is called repeatable runout (RRO).

The controller 30 (for example, processor 26) is configured to perform RRO correction in the process of calculating the burst offset.

Here, a technique to be compared with the embodiment will be described. A technique to be compared with the embodiment is referred to as a comparative example. According to the comparative example, the magnetic disk device adds (or subtracts) a value corresponding to the RRO to the burst offset obtained by the calculation using the amplitude of each burst demodulated signal. The value corresponding to the RRO added to or subtracted from the burst offset is referred to as an RRO correction value. According to the comparative example, the magnetic disk device further performs the linear RRO correction operation. The linear RRO correction operation according to the comparative example is an operation of estimating a change in the RRO correction value, based on a plurality of RRO correction values acquired at a plurality of different radial positions (referred to as RRO training positions), among a plurality of RRO training positions by interpolation, and correcting the position of the magnetic head 22 based on the estimated change in the RRO correction value.

According to the comparative example, when the magnetic head is on the RRO training position, the RRO can be accurately corrected. However, when there is a magnetic head between two RRO training positions adjacent to each other, the RRO cannot be accurately corrected.

Figure 8:
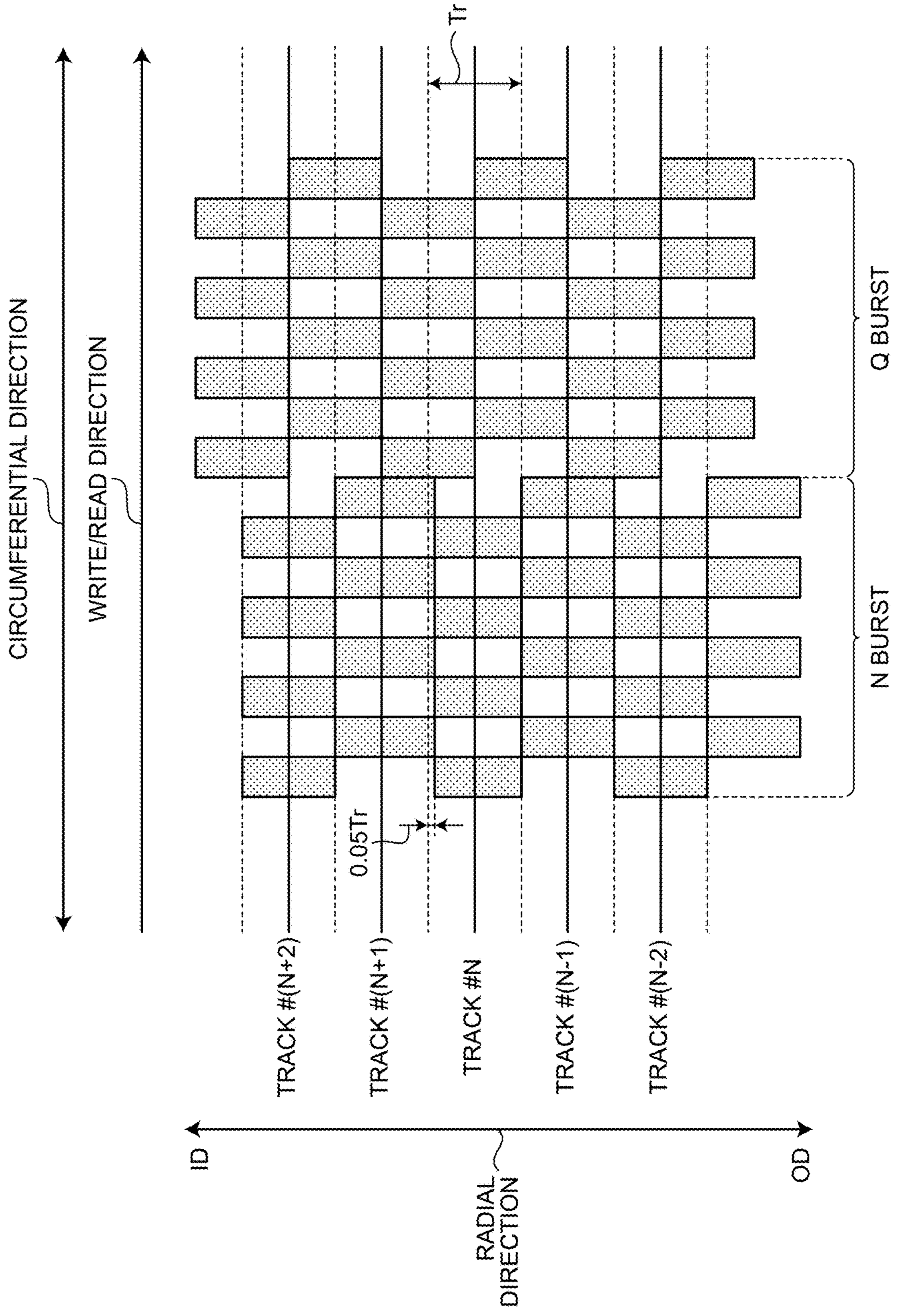
FIG. 8 is a schematic diagram illustrating another example of the configuration of the N burst and the Q burst recorded in the servo sector according to the embodiment (first example: an example in which part of the N burst is depicted with a deviation).

For example, consider a case where the quality of only one of the N burst and the Q burst is poor. FIG. 8 is a schematic diagram illustrating an example in which quality of the N burst is poor among the N burst and the Q burst. An example in which two burst patterns illustrated in this drawing are recorded is referred to as a first example.

The burst pattern configuration according to the first example is different from the burst pattern configuration according to the ideal example illustrated in FIG. 4 in that the edge of the pattern of the N burst to be located at the radial position exactly in the middle between the track #N and the track #(N+1) is shifted to the outer diameter side by 0.05 Tr from the radial position exactly in the middle between the track #N and the track #(N+1).

When the magnetic head 22 passes over the servo region SV at a radial position near the track #N, only the amplitude of the N-burst demodulated signal out of the amplitude of the N-burst demodulated signal and the amplitude of the Q-burst demodulated signal is affected by the deterioration of the quality of the N-burst. Therefore, if only the amplitude of the N-burst demodulated signal out of the amplitude of the N-burst demodulated signal and the amplitude of the Q-burst demodulated signal is corrected, the RRO can be corrected with the highest accuracy.

On the other hand, according to the comparative example, the RRO correction value is defined as a correction value for the burst offset. Therefore, it is not possible to correct only the amplitude of the N-burst demodulated signal out of the amplitude of the N-burst demodulated signal and the amplitude of the Q-burst demodulated signal.

Correcting the burst offset by the RRO correction value corresponds to directly correcting the angle θ on the phase plane. Correcting the burst offset by the RRO correction value is synonymous with performing processing of rotating a set of the amplitude of the N-burst demodulated signal and the amplitude of the Q-burst demodulated signal about the origin on the phase plane.

Figure 9:
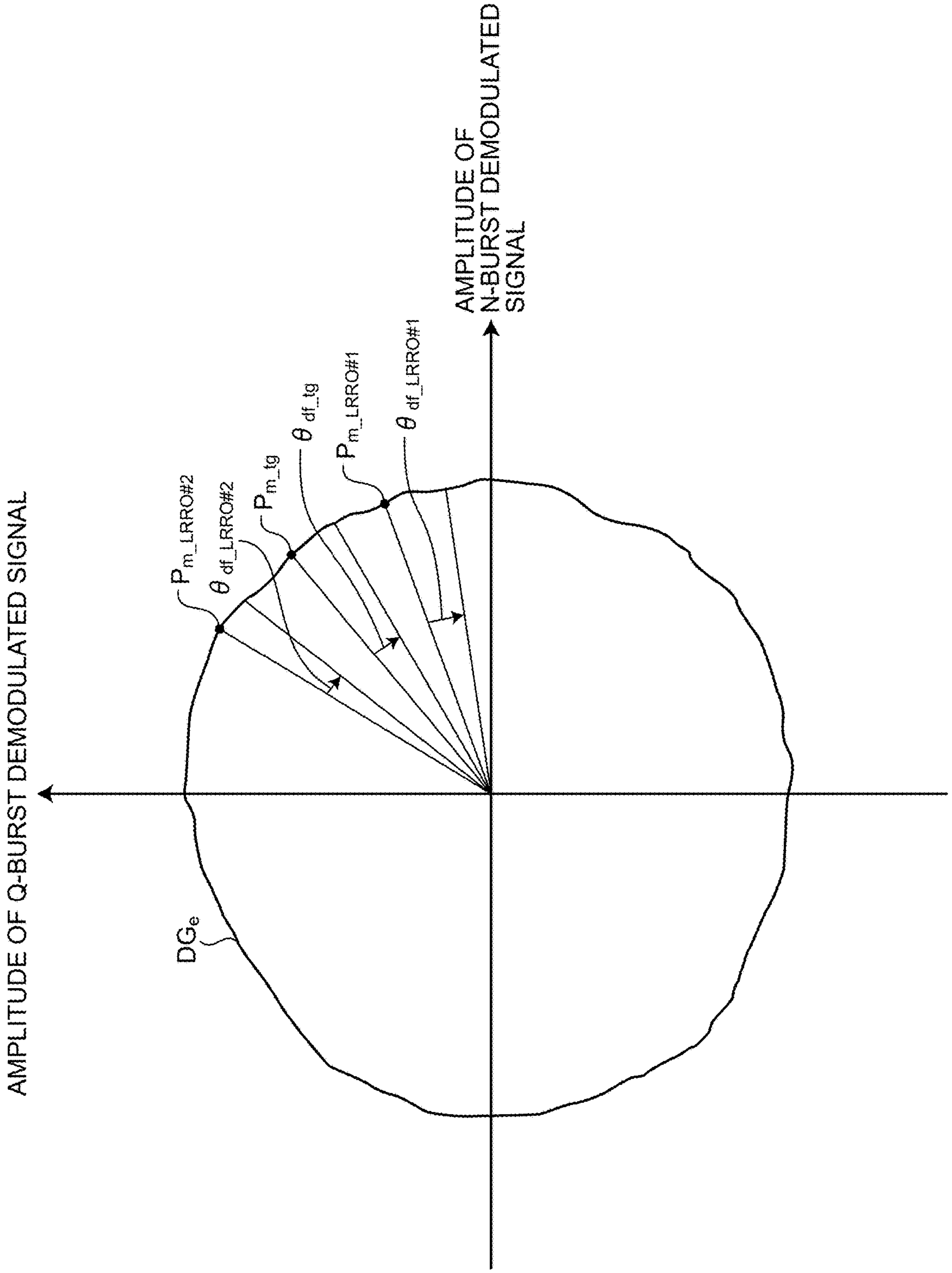
FIG. 9 is a diagram of a phase plane for describing a method of calculating an RRO correction value according to a comparative example.

FIG. 9 is a diagram of a phase plane for describing a method of calculating the RRO correction value according to the comparative example. The Lissajous figure $DG_e$ illustrated in this drawing is an example of a Lissajous figure that is actually observed.

According to the comparative example, when the magnetic head is located at the RRO training position, the RRO correction value at the RRO training position obtained by preliminary training is used. In the case illustrated in FIG. 9, the RRO correction value corresponding to the angle $\theta_{df\_LRRO\ \#1}$ at a certain training position LRRO #1 is acquired in advance by training, and the RRO correction value corresponding to the angle $\theta_{df\_LRRO\ \#2}$ at another training position LRRO #2 adjacent to the training position LRRO #1 is acquired in advance by training. In such a case, when the magnetic head is located at the training position LRRO #1, the RRO correction can be performed with high accuracy by correcting the burst offset calculated from the point $P_{m\_LRRO\ \#1}$ obtained from the demodulated signal by the RRO correction value corresponding to the angle $\theta_{df\_LRRO\ \#1}$. In addition, when the magnetic head is located at the training position LRRO #2, the RRO correction can be performed with high accuracy by correcting the burst offset calculated from the point $P_{m\_LRRO\ \#2}$ obtained from the demodulated signal by the RRO correction value corresponding to the angle $\theta_{df\_LRRO\ \#2}$.

When the magnetic head is located between the training position LRRO #1 and the training position LRRO #2, according to the comparative example, the RRO correction value at the radial position of the magnetic head is estimated by interpolation of the RRO correction value at each of the two RRO training positions. For example, when the magnetic head is located between the training position LRRO #1 and the training position LRRO #2 and the point $P_{m\_tg}$ is obtained from the demodulated signal, the burst offset calculated from the point $P_{m\_tg}$ is corrected by a correction value corresponding to the angle $\theta_{df\_tg}$ obtained by interpolation of the angle $\theta_{df\_LRRO\ \#1}$ and the angle $\theta_{df\_LRRO\ \#2}$. However, performing the RRO correction by using the RRO correction value obtained by such calculation is synonymous with correcting both the amplitude of the N-burst demodulated signal and the amplitude of the Q-burst demodulated signal little by little, and the accuracy of the correction of the RRO is lower than the case of correcting only the amplitude of the N-burst demodulated signal out of the amplitude of the N-burst demodulated signal and the amplitude of the Q-burst demodulated signal.

According to the embodiment, the controller 30 is configured to perform the correction of the RRO by individually and directly correcting the amplitude of the N-burst demodulated signal and the amplitude of the Q-burst demodulated signal. In addition, the controller 30 executes a linear RRO correction operation different from that of the comparative example. According to the linear RRO correction operation of the embodiment, the controller 30 acquires the correction value of the amplitude of the N-burst demodulated signal and the correction value of the amplitude of the Q-burst demodulated signal for each RRO training position. Then, the controller 30 estimates a change in the correction value of the amplitude of the N-burst demodulated signal between the RRO training positions by interpolation. The controller 30 estimates a change in the correction value of the amplitude of the Q-burst demodulated signal between the RRO training positions by interpolation. Then, the controller 30 corrects the amplitude of the N-burst demodulated signal based on the change in the correction value of the estimated amplitude of the N-burst demodulated signal, and corrects the amplitude of the Q-burst demodulated signal based on the change in the correction value of the estimated amplitude of the Q-burst demodulated signal. The controller 30 calculates the burst offset after the RRO correction based on the corrected amplitude of the N-burst demodulated signal and the corrected amplitude of the Q-burst demodulated signal.

Hereinafter, the correction value of the amplitude of the N-burst demodulated signal is referred to as an N-burst correction value. The correction value of the amplitude of the Q-burst demodulated signal is referred to as a Q-burst correction value. A pair of the N-burst correction value and the Q-burst correction value is referred to as RRO correction information.

Next, details of the operation of the magnetic disk device 1 of the embodiment will be described.

The controller 30 is trained about the RRO at each RRO training position in the manufacturing process. Then, the controller 30 calculates the RRO correction information at each RRO training position based on the RRO at each RRO training position.

Figure 10:
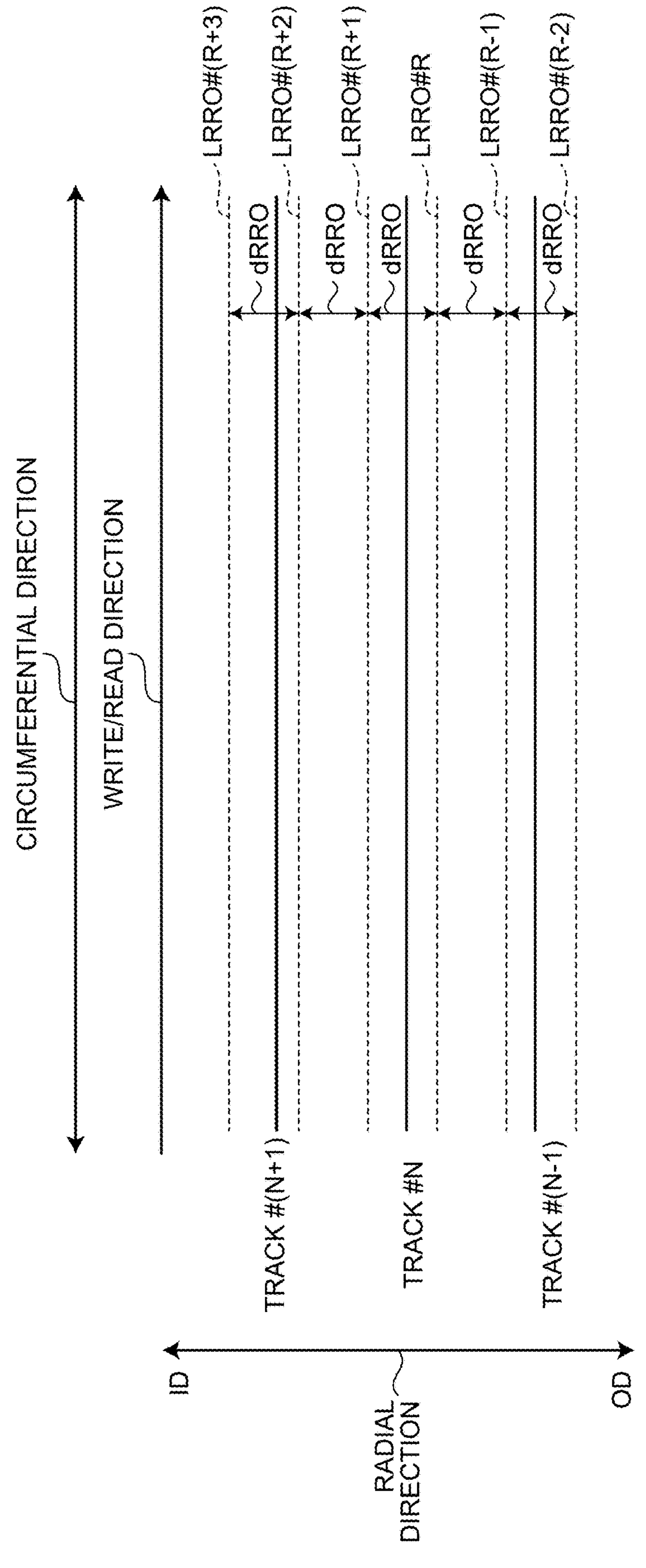
FIG. 10 is a schematic diagram for describing an RRO training position according to the embodiment.

FIG. 10 is a schematic diagram for describing the RRO training position according to the embodiment.

Different radial positions of the magnetic disk 11 are set as the RRO training positions. According to the example illustrated in FIG. 10, regardless of the arrangement of each track 41, RRO training positions are arranged at intervals of a predetermined distance dRRO in the radial direction. An identification number that increases by one toward the inner diameter side is given to each RRO training position. The RRO training position of which the identification number is Y (where Y is numerical information) is referred to as an RRO training position #Y. FIG. 10 illustrates six RRO training positions #(R−2) to #(R+3) as one example of the RRO training positions.

Note that the arrangement of the RRO training positions is not limited to the example illustrated in FIG. 10. The manufacturer can set multiple RRO training positions in any manner. The RRO training positions are not necessarily provided at equal intervals in the radial direction.

Figure 11:
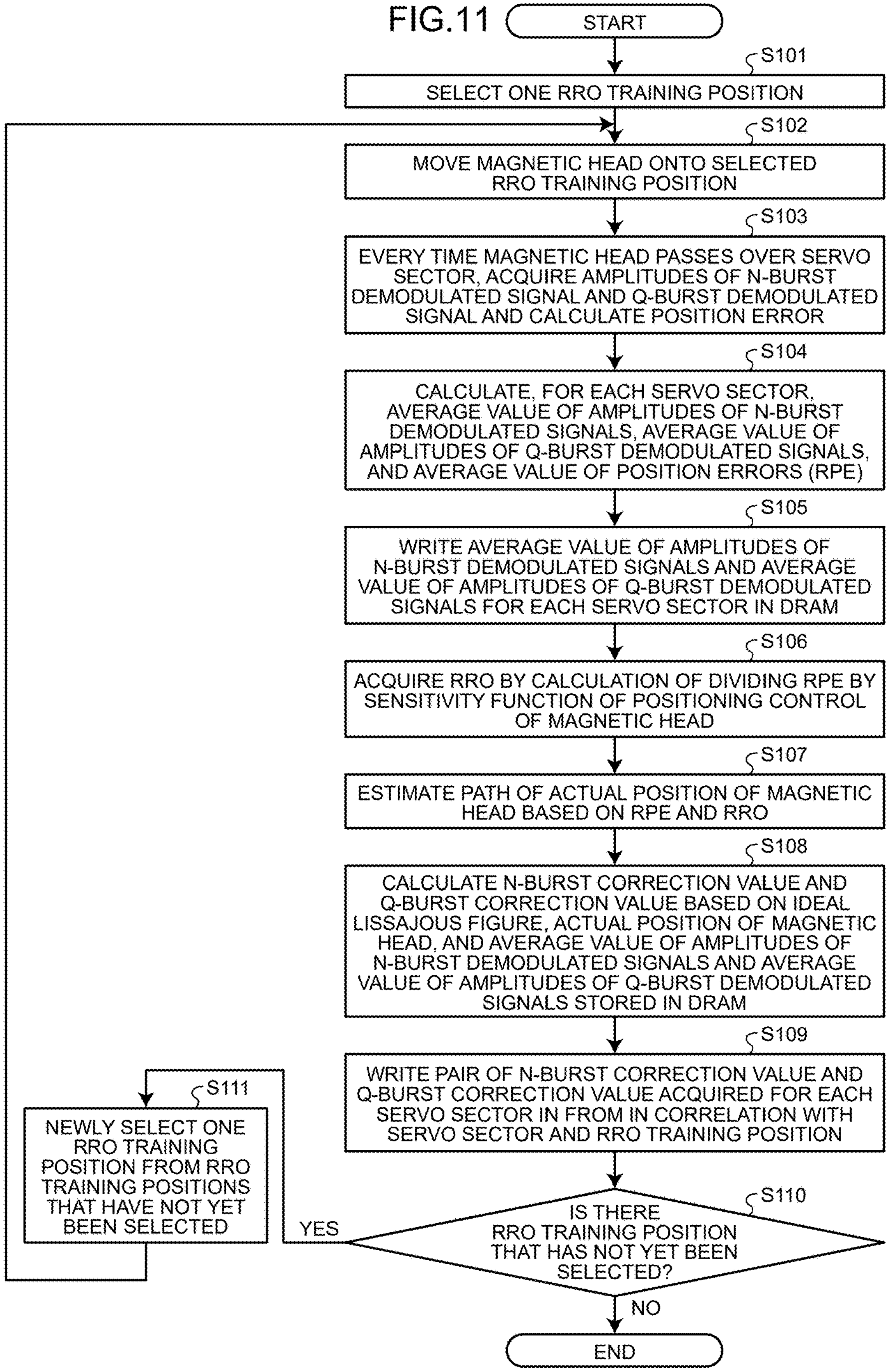
FIG. 11 is a flowchart illustrating an example of an operation of calculating RRO correction information according to the embodiment.

FIG. 11 is a flowchart illustrating an example of an operation of calculating RRO correction information according to the embodiment. A series of operations illustrated in this drawing is executed in a manufacturing process of the magnetic disk device 1.

First, the controller 30 selects one of RRO training positions (S101). The controller 30 controls the VCM 16 via the SVC 21 to move the magnetic head 22 onto the selected RRO training position (S102).

In a state where the magnetic head 22 is maintained at the RRO training position, every time the magnetic head 22 passes over the servo sector SV, the controller 30 acquires the amplitudes of the N-burst demodulated signal and the Q-burst demodulated signal and calculates the position error (S103).

In step S103, the controller 30 acquires the burst offset by performing the calculation of Formula (2) and the calculation of Formula (1) by using the amplitude of the N-burst demodulated signal and the amplitude of the Q-burst demodulated signal obtained when the magnetic head 22 passes on one servo sector SV. The controller 30 calculates the demodulation position based on the burst offset and the cylinder address. Then, the controller 30 acquires a difference between the demodulation position and the target position (that is, the RRO training position) as a position error.

The process of step S103 is executed every time the magnetic disk 11 rotates multiple time. Therefore, the controller 30 acquires sets each including the amplitude of each of the N-burst demodulated signal and the Q-burst demodulated signal and the position error for each servo sector SV on the RRO training position.

The controller 30 calculates, for each servo sector SV, an average value of amplitudes of N-burst demodulated signals, an average value of amplitudes of Q-burst demodulated signals, and an average value of position errors (S104). Then, the controller 30 writes the average value of the amplitudes of the N-burst demodulated signals and the average value of the amplitudes of the Q-burst demodulated signals obtained for each servo sector SV in the DRAM 29 (S105).

The path indicated by the average value of the position errors obtained for each servo sector SV can be considered to represent a repeatable position error (RPE). The controller 30 acquires the RRO at the selected RRO training position by calculation of dividing the RPE by the sensitivity function of the positioning control of the magnetic head 22 (S106). The sensitivity function of the positioning control of the magnetic head 22 is stored in advance in a predetermined storage area (for example, the FROM 28), and the controller 30 reads the sensitivity function from the storage area and uses the sensitivity function.

The RPE at the RRO training position represents a difference between the path of the demodulation position represented by the reference of the servo-pattern configuration recorded on the magnetic disk 11 and the path of the RRO training position represented by the reference of the servo-pattern configuration recorded on the magnetic disk 11. The RRO at the RRO training position represents a difference between the path of the RRO training position represented by the reference of the servo pattern configuration recorded on the magnetic disk 11 and the path of the RRO training position represented by the reference of the ideal servo-pattern configuration. The ideal servo pattern configuration is a servo pattern configuration recorded so as to define the track 41 having a perfect circle shape without an RRO (for example, the servo-pattern configuration according to the ideal example illustrated in FIG. 4). Therefore, the path of the RRO training position represented by the reference of the ideal servo-pattern configuration has a perfect circle shape. In the present specification, the position information representing the position of the magnetic head 22 based on the ideal servo-pattern configuration is the actual position information of the magnetic head 22, namely, the actual position of the magnetic head 22.

Based on the RPE and the RRO, the controller 30 estimates a path of an actual position of the magnetic head 22, namely, position information representing a radial position through which the magnetic head 22 has passed as a reference of an ideal servo-pattern configuration (S107).

For each servo sector SV, the controller 30 calculates an N-burst correction value and a Q-burst correction value based on an ideal Lissajous figure, an actual position of the magnetic head 22, and an average value of amplitudes of N-burst demodulated signals and an average value of amplitudes of Q-burst demodulated signals written in the DRAM 29 (S108).

Figure 12:
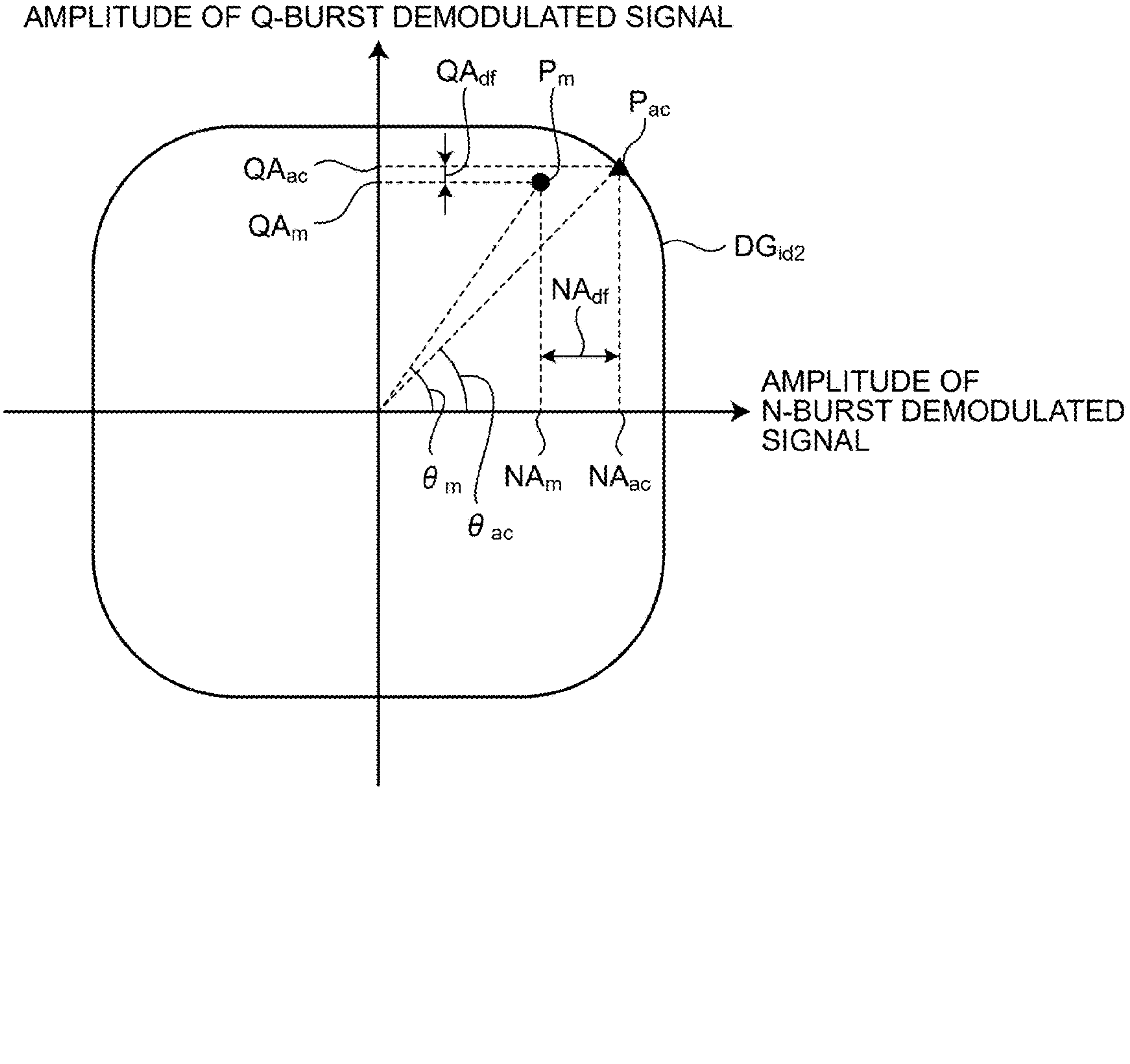
FIG. 12 is a schematic diagram for describing a method of calculating an N-burst correction value and a Q-burst correction value by using an ideal Lissajous figure according to the embodiment.

FIG. 12 is a schematic diagram for describing a method of calculating an N-burst correction value and a Q-burst correction value by using an ideal Lissajous figure according to the embodiment. Note that the calculation operation described with reference to this drawing is individually executed for each servo sector SV.

An ideal Lissajous figure is set in advance in the controller 30. The ideal Lissajous figure $DG_{id2}$ is a Lissajous figure obtained by plotting, on a phase plane, a set of the amplitude of the N-burst demodulated signal obtained by demodulating the N-burst included in the ideal servo-pattern configuration and the amplitude of the Q-burst demodulated signal obtained by demodulating the Q-burst included in the ideal servo-pattern configuration, in a case where it is assumed that the N-burst and the Q-burst recorded on the magnetic disk 11 correspond to an ideal servo-pattern configuration.

The ideal Lissajous figure $DG_{id2}$ is acquired by calculation or actual measurement by the manufacturer, and information indicating the acquired ideal Lissajous figure $DG_{id2}$ is stored in advance in a predetermined storage area (for example, the DRAM 29 or the FROM 28).

In practice, it is difficult to record an N burst and a Q burst having an ideal servo-pattern configuration on a magnetic disk. The manufacturer prepares magnetic disks each having relatively high quality of recorded N-burst and Q-burst, and measures a Lissajous figure from each of the magnetic disks. Then, the manufacturer may set one Lissajous figure obtained by averaging the Lissajous figures obtained for each magnetic disk in the controller 30 as an ideal Lissajous figure $DG_{id2}$.

The controller 30 acquires the angle $\theta_{AC}$ corresponding to the actual position by performing back calculation of the calculation of the Formula (1) by using the actual position. Then, the controller 30 determines the point $P_{AC}$ corresponding to the angle $\theta_{AC}$ in the Lissajous figure $DG_{id2}$, and acquires a pair of the amplitude $NA_{AC}$ of the N-burst demodulated signal and the amplitude $QA_{AC}$ of the Q-burst demodulated signal representing the point $P_{AC}$.

A pair of the amplitude $NA_{AC}$ and the amplitude $QA_{AC}$ is a pair of the amplitude of the N-burst demodulated signal and the amplitude of the Q-burst demodulated signal obtained when the magnetic head 22 passes over the servo sector SV at the actual position in a case where it is assumed that the N burst and the Q burst recorded on the magnetic disk 11 correspond to an ideal servo-pattern configuration.

The controller 30 acquires a difference $NA_{df}$ between the amplitude $NA_m$ and the amplitude $NA_{AC}$ as an N-burst correction value. The controller 30 acquires a difference $QA_{df}$ between the amplitude $QA_m$ and the amplitude $QA_{AC}$ as a Q-burst correction value. The amplitude $NA_m$ is an average value of the amplitudes of the N-burst demodulated signals written in the DRAM 29 by the processing in step S105. The amplitude $QA_m$ is an average value of the amplitudes of the Q-burst demodulated signals written in the DRAM 29 by the processing in step S105.

Note that the acquired N-burst correction value $NA_{df}$ and Q-burst correction value $QA_{df}$ at the RRO training position are used as follows.

Figure 13:
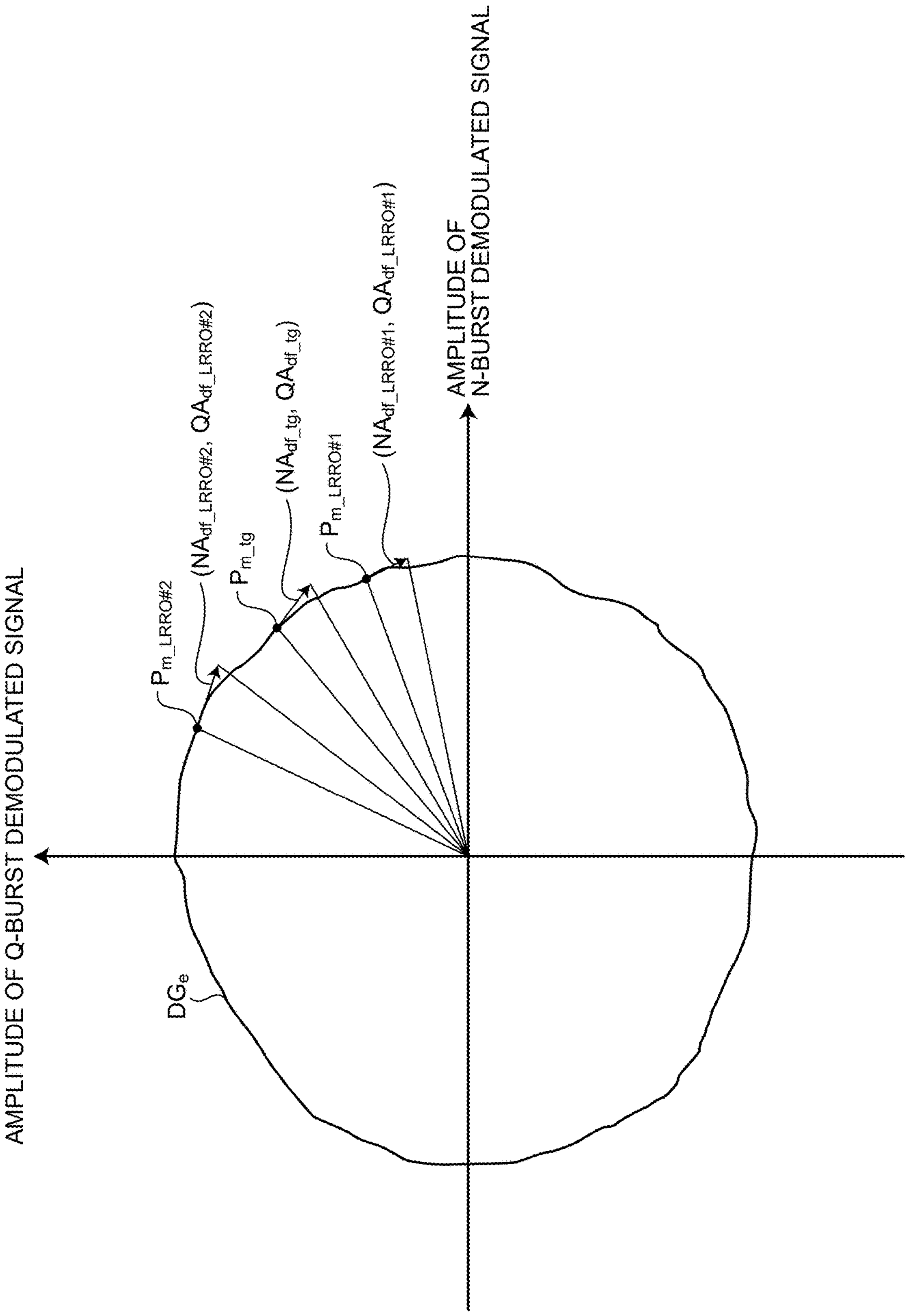
FIG. 13 is a diagram of a phase plane for describing a method of usage of the RRO correction information according to the embodiment.

FIG. 13 is a diagram of a phase plane for describing a method of usage of the RRO correction information according to the embodiment. The Lissajous figure $DG_e$ illustrated in this drawing is an example of a Lissajous figure that is actually observed at the time of positioning operation.

According to the example illustrated in FIG. 13, the N-burst correction value $NA_{df\_LRRO\ \#1}$ and the Q-burst correction value $QA_{df\_LRRO\ \#1}$ are acquired as the RRO correction information at the RRO training position LRRO #1 by the calculation described with reference to FIG. 12. In addition, the N-burst correction value $NA_{df\_LRRO\ \#2}$ and the Q-burst correction value $QA_{df\_LRRO\ \#2}$ are acquired as the RRO correction information at the RRO training position LRRO #2.

For example, when the magnetic head 22 is located between the training position LRRO #1 and the training position LRRO #2 and the point $P_{m\_tg}$ is obtained from the demodulated signal, the controller 30 interpolates the N-burst correction value $NA_{df\_tg}$ at the current demodulation position based on $NA_{df\_LRRO\ \#1}$ and $NA_{df\_LRRO\ \#2}$. The controller 30 interpolates the Q-burst correction value $QA_{df\_tg}$ at the current demodulation position based on $QA_{df\_LRRO\ \#1}$ and $Q_{Adf\_LRRO\ \#2}$. Then, the controller 30 corrects the amplitude of the N-burst demodulated signal by using the N-burst correction value $NA_{df\_tg}$, and corrects the amplitude of the Q-burst demodulated signal by using the Q-burst correction value $QA_{df\_tg}$. As described above, according to the embodiment, the N-burst correction value and the Q-burst correction value are individually interpolated. Further details of the description of the RRO correction according to the embodiment will be described later.

The description returns to FIG. 11. After calculating the N-burst correction value and the Q-burst correction value for each servo sector SV, the controller 30 records a pair of the N-burst correction value and the Q-burst correction value acquired for each servo sector SV in the FROM 28 in correlation with the servo sector SV and the RRO training position (S109).

Then, the controller 30 determines whether or not there is an RRO training position that has not yet been selected (S110).

If there is an RRO training position that has not yet been selected (S110: Yes), the controller 30 newly selects one RRO training position from the RRO training positions that have not yet been selected (S111). Then, the controller 30 executes the processing of steps S102 to S109 for the newly selected RRO training position.

If there is no RRO training position that has not yet been selected (S110: No), the operation of calculating the RRO correction information ends.

After shipment of the magnetic disk device 1, the controller 30 performs the RRO correction using the RRO correction information at the time of positioning control of the magnetic head 22.

Figure 14:
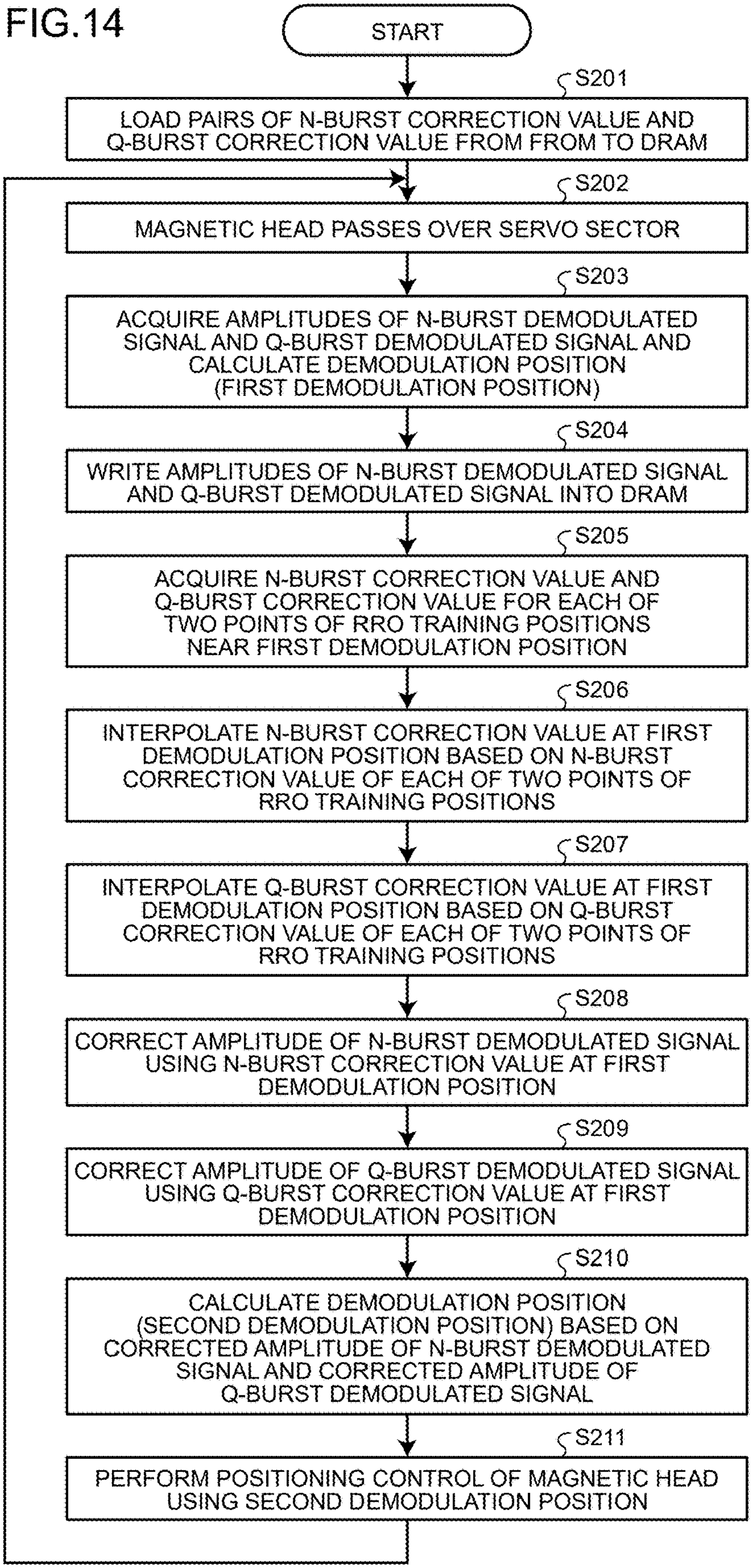
FIG. 14 is a flowchart illustrating an example of a series of operations including the RRO correction according to the embodiment.

FIG. 14 is a flowchart illustrating an example of a series of operations including the RRO correction according to the embodiment.

First, at the start of operation, the controller 30 loads a group of pairs of an N-burst correction value and a Q-burst correction value from the FROM 28 to the DRAM 29 (S201).

When the magnetic head 22 passes over the servo sector SV (S202), the controller 30 acquires the amplitudes of the N-burst demodulated signal and the Q-burst demodulated signal and calculates the demodulation position (S203).

In step S203, the controller 30 acquires the burst offset by performing the calculation of Formula (2) and the calculation of Formula (1) by using the amplitude of the N-burst demodulated signal and the amplitude of the Q-burst demodulated signal obtained when the magnetic head 22 passes on the servo sector SV. The controller 30 calculates the demodulation position based on the burst offset and the cylinder address. In the description of FIG. 14, the demodulation position obtained by the processing in step S203 is referred to as a first demodulation position.

The controller 30 writes the amplitudes of the acquired N-burst demodulated signal and Q-burst demodulated signal into the DRAM 29 (S204).

The controller 30 acquires the N-burst correction value and the Q-burst correction value for each of two points of the RRO training positions near the first demodulation position from the group of pairs of the N-burst correction value and the Q-burst correction value loaded into the DRAM 29 (S205).

The two points of RRO training positions near the first demodulation position are, for example, an RRO training position closest to the first demodulation position among the RRO training positions located on the outer diameter side of the first demodulation position, and an RRO training position closest to the first demodulation position among the RRO training positions located on the inner diameter side of the first demodulation position. Note that examples of the two points of the RRO training positions near the first demodulation position are not limited thereto.

In step S205, the controller 30 acquires, for each of the two points of the RRO training positions near the first demodulation position, a pair of the N-burst correction value and the Q-burst correction value correlated with the servo sector SV (see S202) on which the magnetic head 22 passed last.

The controller 30 interpolates the N-burst correction value at the first demodulation position based on the N-burst correction value of each of the two points of the RRO training positions (S206). In addition, the controller 30 interpolates the Q-burst correction value at the first demodulation position based on the Q-burst correction value of each of the two points of the RRO training positions (S207).

In step S206, the controller 30 acquires the N-burst correction value at the first demodulation position by using, for example, the following Formula (3). In Formula (3), $NA_{df\_tg}$ is the N-burst correction value at the first demodulation position. $NA_{df\_LRRO1}$ is an N-burst correction value at one of the two points of the RRO training positions (referred to as a first RRO training position). $NA_{df\_LRRO2}$ is an N-burst correction value at another one of the two points of the RRO training positions (referred to as a second RRO training position). POS 1 is the first demodulation position. The LRRO1 is the first RRO training position. The LRRO2 is the second RRO training position.

$$NA_{df\_tg}=NA_{df\_LRRO1}+(NA_{df\_LRRO2}-NA_{df\_LRRO1})\times(POS1-LRRO1)/(LRRO2-LRRO1) \tag{3}$$

In step S207, the controller 30 acquires the N-burst correction value at the first demodulation position by using, for example, the following Formula (4). In Formula (4), $NA_{df\_tg}$ is the N-burst correction value at the first demodulation position. $QA_{df\_LRRO1}$ is a Q-burst correction value at the first RRO training position. $QA_{df\_LRRO2}$ is a Q-burst correction value at the second RRO training position.

$$QA_{df\_tg}=QA_{df\_LRRO1}+(QA_{df\_LRRO2}-QA_{df\_LRRO1})\times(POS1-LRRO1)/(LRRO2-LRRO1) \tag{4}$$

The controller 30 reads the amplitude of the N-burst demodulated signal stored in the DRAM 29, and corrects the amplitude of the read N-burst demodulated signal by using the N-burst correction value $NA_{df}$_tg at the first demodulation position (S208). In addition, the controller 30 reads the amplitude of the Q-burst demodulated signal stored in the DRAM 29, and corrects the amplitude of the read Q-burst demodulated signal by using the Q-burst correction value $QA_{df\_tg}$ at the first demodulation position (S209).

In step S208, the controller 30 performs correction by using the following Formula (5), for example. In Formula (5), $NA_{tg}$ is the amplitude of the N-burst demodulated signal acquired by the processing in step S203 and stored in the DRAM 29 by the processing in step S204. $NA_{tg}'$ is the corrected amplitude of the N-burst demodulated signal.

$$NA_{tg}'=NA_{tg}+NA_{df\_tg} \tag{5}$$

In step S209, the controller 30 performs correction by using the following Formula (6), for example. In Formula (6), $QA_{tg}$ is the amplitude of the Q-burst demodulated signal acquired by the processing in step S203 and stored in the DRAM 29 by the processing in step S204. $QA_{tg}'$ is the corrected amplitude of the N-burst demodulated signal.

$$QA_{tg}'=QA_{tg}+QA_{df\_tg} \tag{6}$$

The controller 30 calculates the demodulation position again based on the corrected amplitude $NA_{tg}'$ of the N-burst demodulated signal and the corrected amplitude $QA_{tg}'$ of the Q-burst demodulated signal (S210).

In step S210, the controller 30 obtains the burst offset by performing the calculation of Formula (2) and the calculation of Formula (1) by using the amplitude $NA_{tg}'$ and the amplitude $QA_{tg}'$. The controller 30 calculates the demodulation position based on the burst offset and the cylinder address. The demodulation position obtained by the processing in step S210 is referred to as a second demodulation position.

The controller 30 performs positioning control of the magnetic head 22 by using the second demodulation position (S211). The second demodulation position is regarded as the current position of the magnetic head 22, and the magnetic head 22 is positioned. Then, the control transitions to step S202.

With reference to FIGS. 15 to 21, the process of the RRO correction will be described by taking a case where the N burst and the Q burst recorded on the magnetic disk 11 are burst pattern configurations according to the first example illustrated in FIG. 8 as one example.

Figure 15:
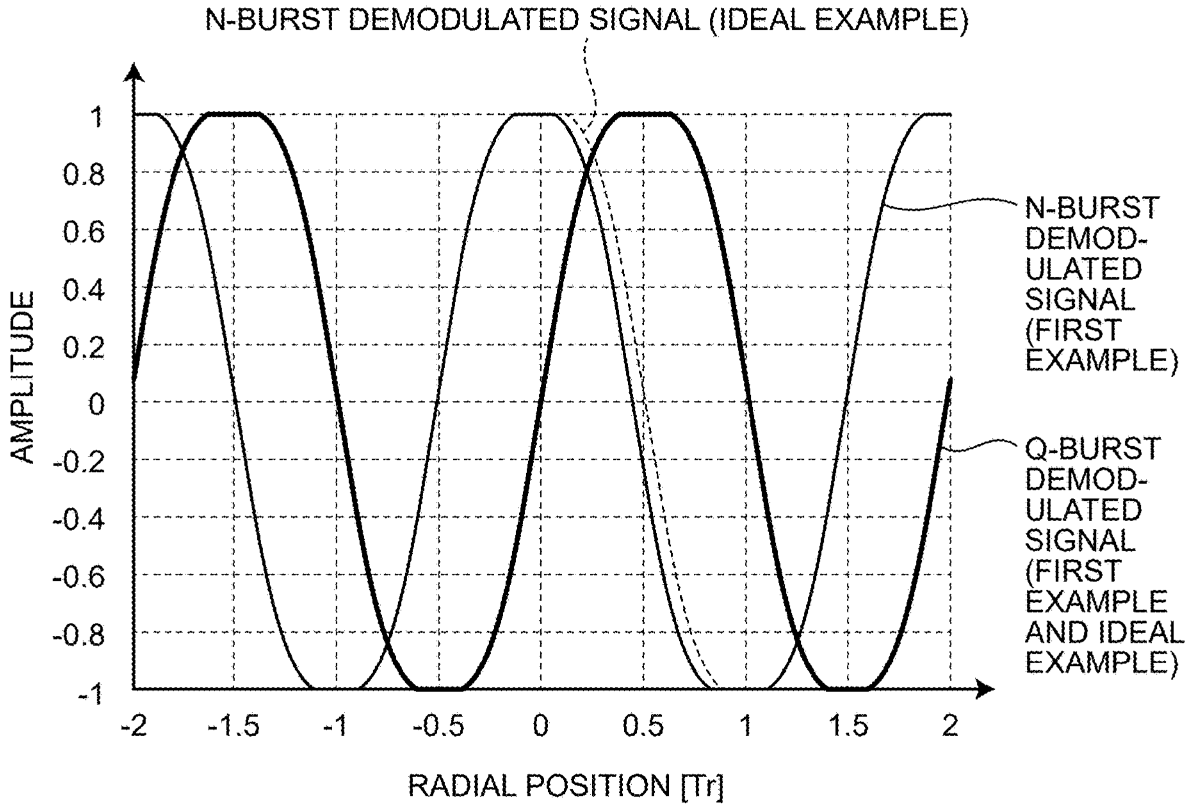
FIG. 15 is a diagram illustrating an example of the relationship between the amplitude of each of the N-burst demodulated signal and the Q-burst demodulated signal and the radial position of the magnetic head according to the first example.

FIG. 15 is a diagram illustrating an example of the relationship between the amplitude of each of the N-burst demodulated signal and the Q-burst demodulated signal and the radial position of the magnetic head 22 according to the first example. In FIG. 15, the horizontal axis indicates a radial position with the track center of a certain track 41 (here, track #N in FIG. 8 as one example) as an origin. The radial position is expressed in units of tracks. The vertical axis indicates the amplitude.

FIG. 15 additionally illustrates the amplitude of each burst demodulated signal in the ideal example for comparison.

With the burst data configuration according to the first example illustrated in FIG. 8, the edge of the pattern of the N burst to be located at the radial position exactly in the middle between the track #N and the track #(N+1) is shifted to the outer diameter side by 0.05 Tr from the radial position exactly in the middle between the track #N and the track #(N+1). From FIG. 15, it can be seen that an error occurs in the amplitude of the N-burst demodulated signal at the radial position in the range of 0 Tr to 1 Tr due to the edge deviation of the N-burst pattern. In addition, it can be seen that no error occurs with respect to the amplitude of the Q-burst demodulated signal.

Figure 16:
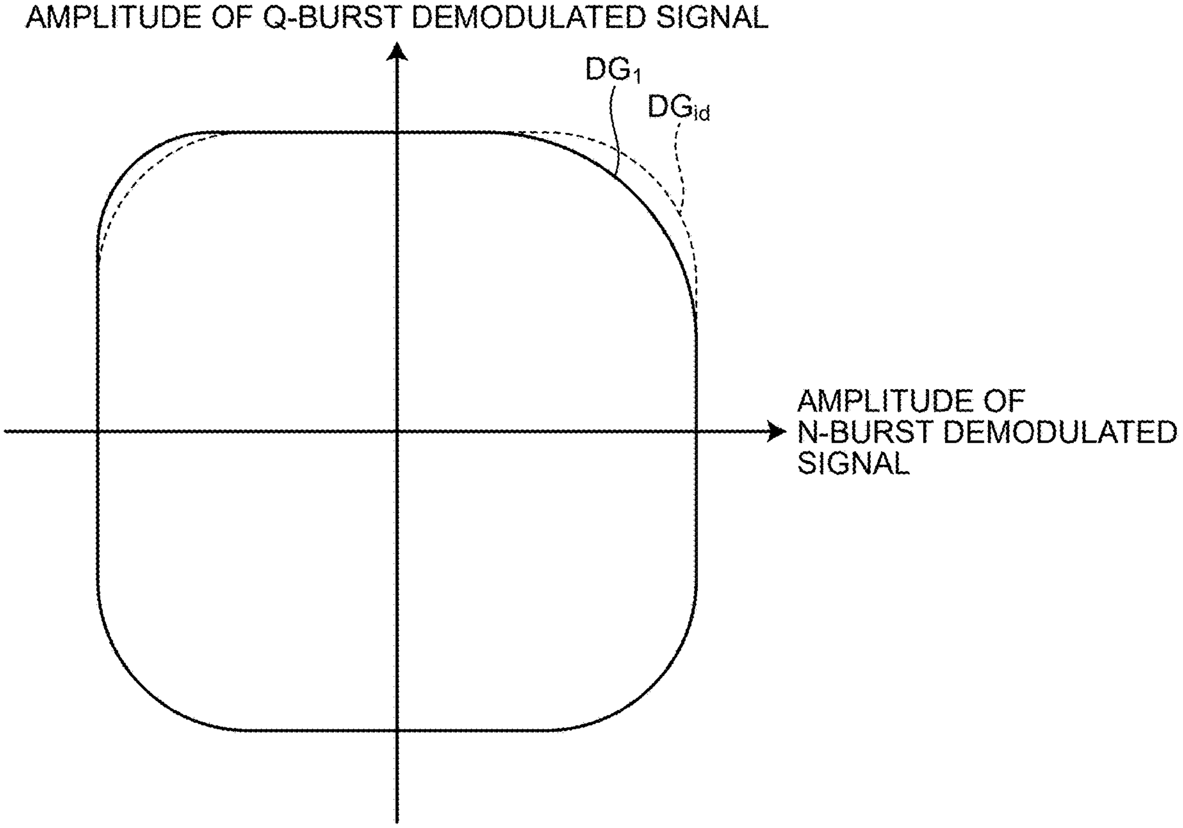
FIG. 16 is a diagram illustrating a Lissajous figure according to the first example.

FIG. 16 is a diagram illustrating a Lissajous figure according to the first example. It can be seen that the Lissajous figure $DG_1$ according to the first example is distorted in the vicinity of the angle θ=45° (degree) and in the vicinity of the angle θ=135° (degree) as compared with the Lissajous figure $DG_{id}$ according to the ideal example.

Figure 17:
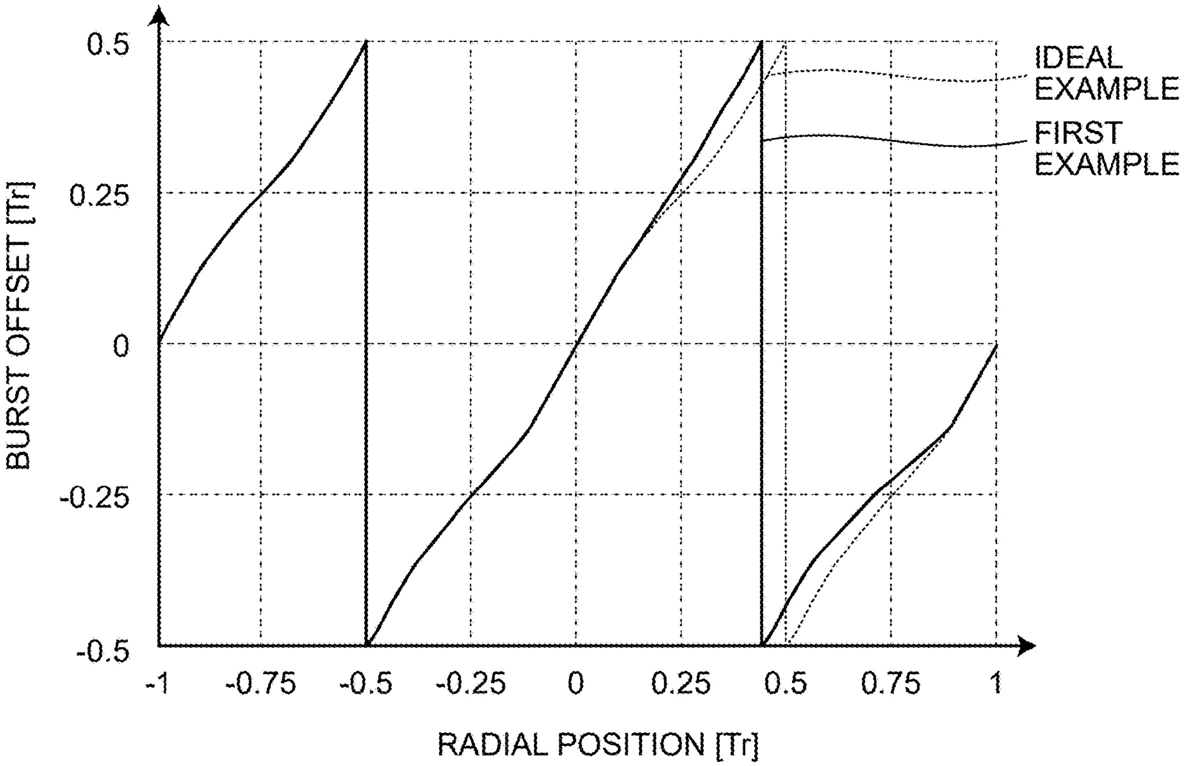
FIG. 17 is a diagram illustrating a relationship between a first demodulation position and a radial position according to the first example.

FIG. 17 is a diagram illustrating a relationship between the first demodulation position and the radial position according to the first example. The horizontal axis indicates a radial position with track #N as an origin. The vertical axis indicates the burst offset. Both the radial position and the burst offset are expressed in units of tracks. From this figure, it can be seen that, according to the first example, an error occurs in the calculated value of the burst offset at a radial position near 0.5 Tr.

Figure 18:
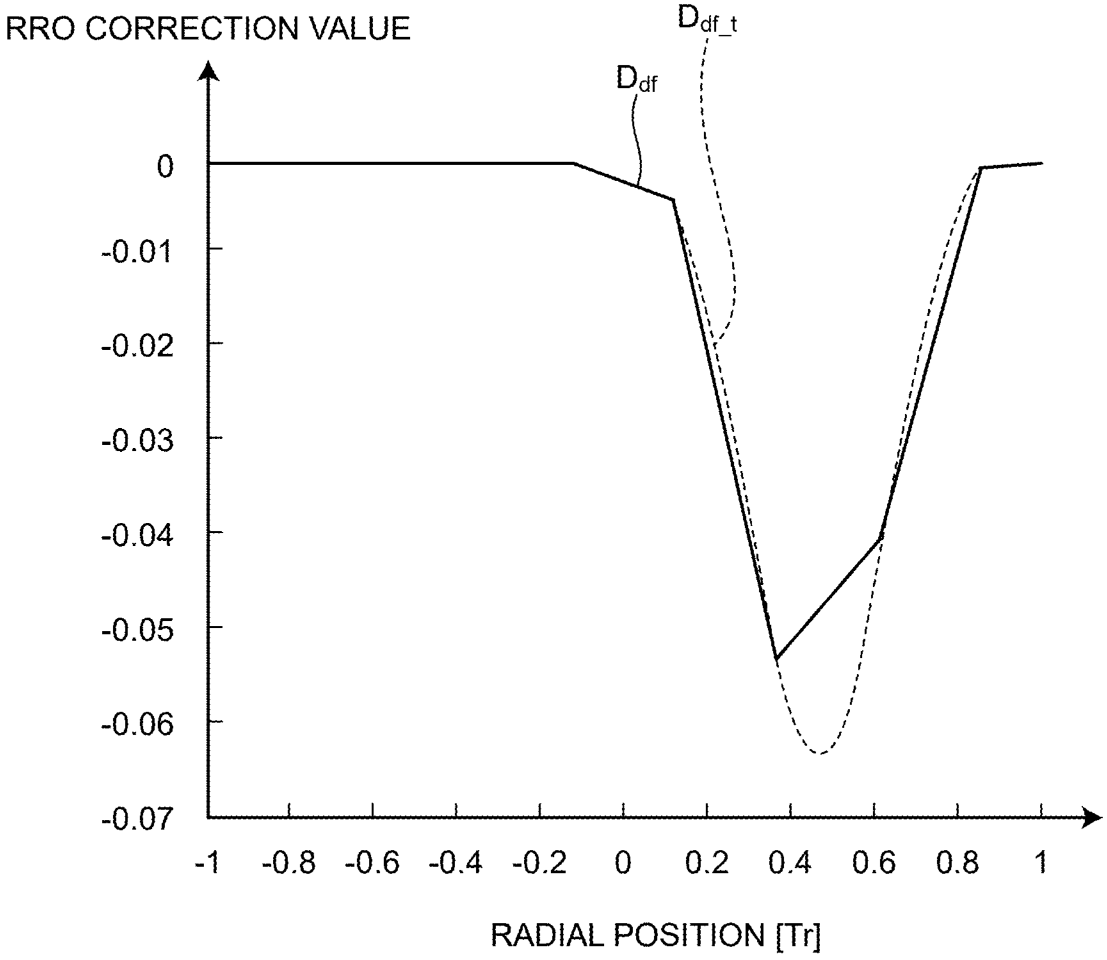
FIG. 18 is a diagram illustrating a relationship between the RRO correction value and the radial position according to the first example in a case the comparative example is applied.

FIG. 18 is a diagram illustrating a relationship between the RRO correction value and the radial position according to the first example in a case the comparative example is applied. The horizontal axis indicates a radial position with track #N as an origin. The vertical axis indicates the RRO correction value. The RRO training positions are ±0.125 Tr, ±0.375 Tr, ±0.625 Tr, and ±0.875 Tr around the radial position 0. For comparison, FIG. 18 illustrates the RRO correction value $D_{df\_t}$ obtained when the RRO is actually trained at each radial position.

As illustrated in FIG. 18, the RRO correction value $D_{df}$ changes with respect to the radial position with a tendency to substantially match with the RRO correction value $D_{df\_t}$, but the deviation between the RRO correction value $D_{df}$ and the RRO correction value $D_{df\_t}$ increases in the vicinity of the radial position of 0.5 Tr between the radial position of 0.375 Tr and the radial position of 0.625 Tr, which are two adjacent RRO training positions.

Figure 19:
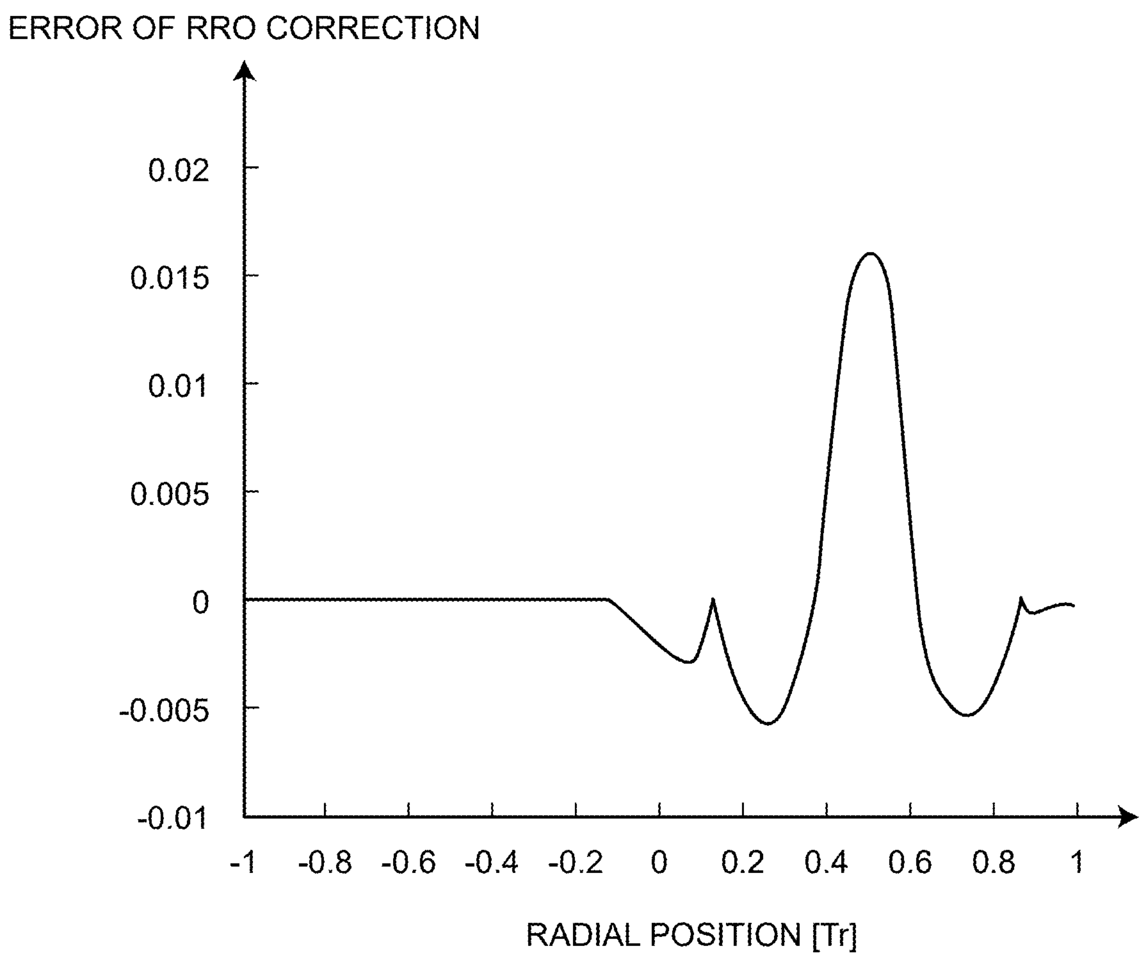
FIG. 19 is a diagram illustrating an error of the RRO correction according to the first example in a case the comparative example is applied.

FIG. 19 is a diagram illustrating an error of the RRO correction according to the first example in a case the comparative example is applied. The horizontal axis indicates a radial position with track #N as an origin. The vertical axis indicates an error of the RRO correction. Note that the error of the RRO correction is a positional deviation amount due to the RRO remaining after the RRO correction.

As illustrated in FIG. 19, according to the comparative example, the deviation between the RRO correction value $D_{df}$ and the RRO correction value $D_{df\_t}$ is large in the vicinity of the radial position of 0.5 Tr, and thus, the error of the RRO correction is large.

Figure 20:
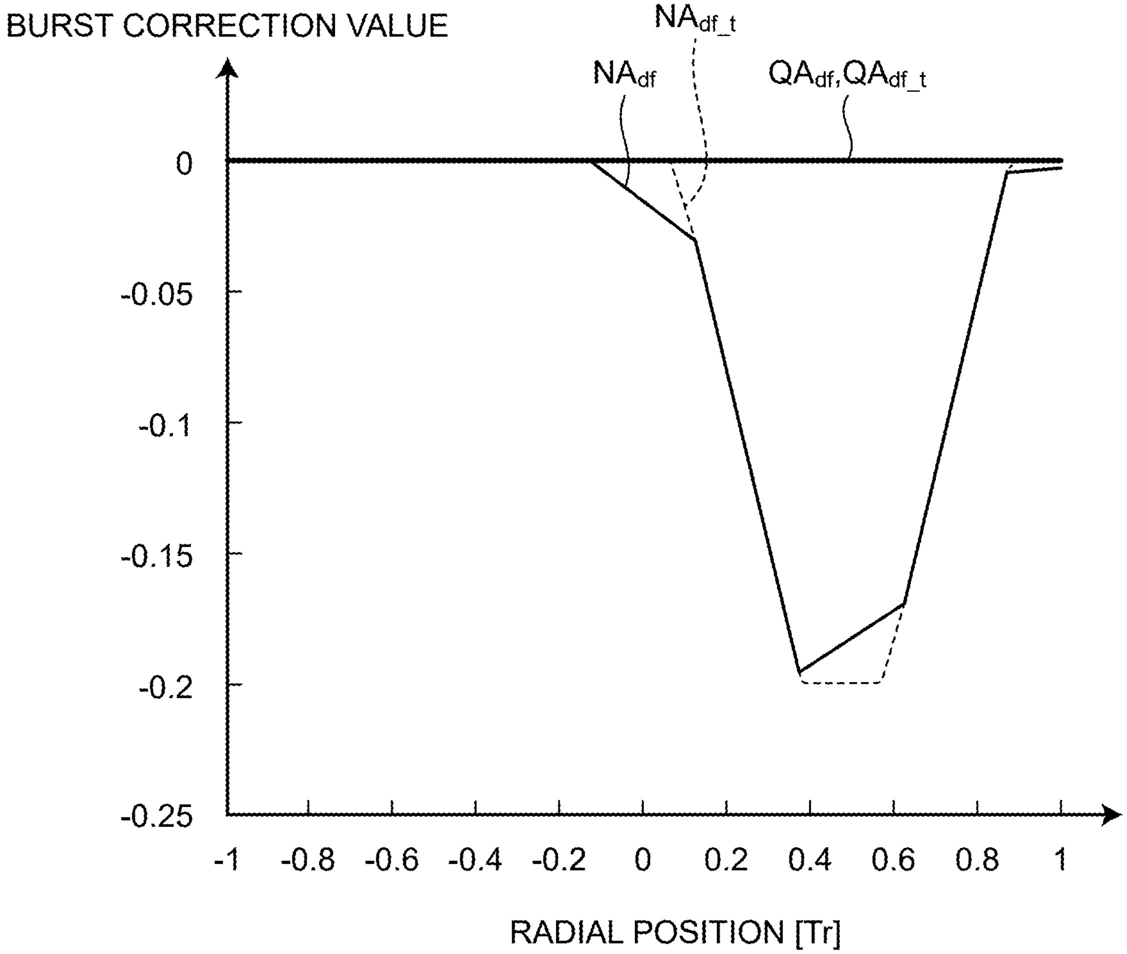
FIG. 20 is a diagram illustrating a relationship between an N-burst correction value and a Q-burst correction value, and a radial position according to the first example in a case where the embodiment is applied.

FIG. 20 is a diagram illustrating a relationship between an N-burst correction value $NA_{df}$ and a Q-burst correction value $QA_{df}$, and a radial position according to the first example in a case where the embodiment is applied. The horizontal axis indicates a radial position with track #N as an origin. The vertical axis indicates each burst correction value. The RRO training positions are ±0.125 Tr, ±0.375 Tr, ±0.625 Tr, and ±0.875 Tr around the radial position 0.

For comparison, FIG. 20 illustrates an N-burst correction value $NA_{df}$t and a Q-burst correction value $QA_{df}$t obtained in a case where the RRO is actually trained at each radial position.

The N-burst correction value $NA_{df\_t}$ takes a negative value at a radial position near 0.5 Tr. It can be seen that the N-burst correction value $NA_{df}$ changes with respect to the radial position with a tendency substantially match with the N-burst correction value $NA_{df\_t}$.

The Q-burst correction value $QA_{df\_t}$ is "0" at any radial position. According to the burst pattern configuration according to the first example, correction of the Q-burst demodulated signal is unnecessary. Similarly to the Q-burst correction value $QA_{df\_t}$, the Q-burst correction value $QA_{df}$ is "0" at any radial position.

Therefore, the controller 30 corrects only the amplitude of the N-burst demodulated signal out of the amplitude of the N-burst demodulated signal and the amplitude of the Q-burst demodulated signal.

Figure 21:
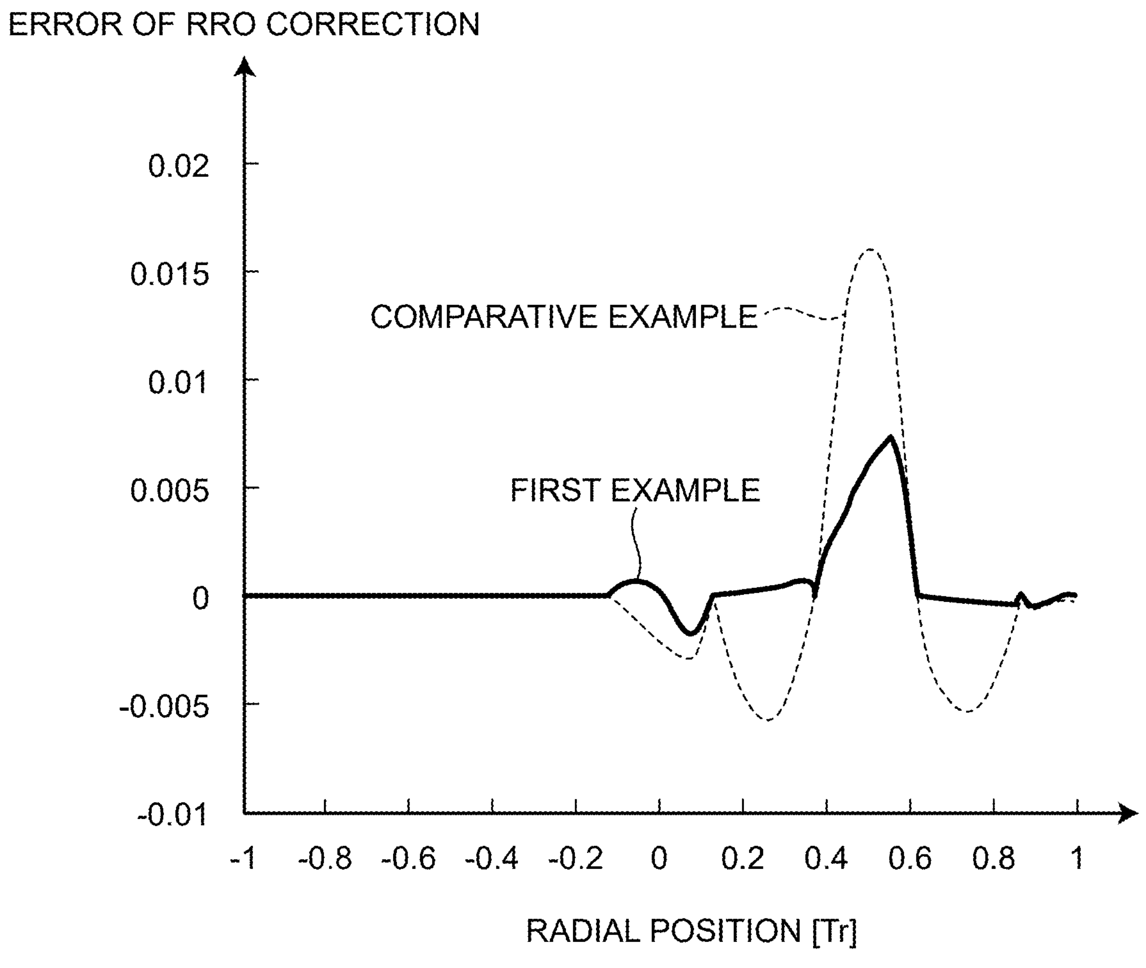
FIG. 21 is a diagram illustrating an effect of the RRO correction according to the first example in a case where the embodiment is applied.

FIG. 21 is a diagram illustrating an effect of the RRO correction according to the first example in a case where the embodiment is applied. The horizontal axis indicates a radial position with track #N as an origin. The vertical axis indicates an error of the RRO correction.

In FIG. 21, a dotted line indicates an error of the RRO correction in a case the comparative example is applied. A solid line indicates an error of the RRO correction in a case where the embodiment is applied. From the drawing, it can be seen that according to the embodiment, the error of the RRO correction is smaller than that of the comparative example. It can be said that the RRO correction can be performed with higher accuracy in the first example than in the comparative example according to the embodiment.

Next, a second example will be described. In the second example, a case where the quality of both the N burst and the Q burst is inferior to that of the ideal example will be described.

Figure 22:
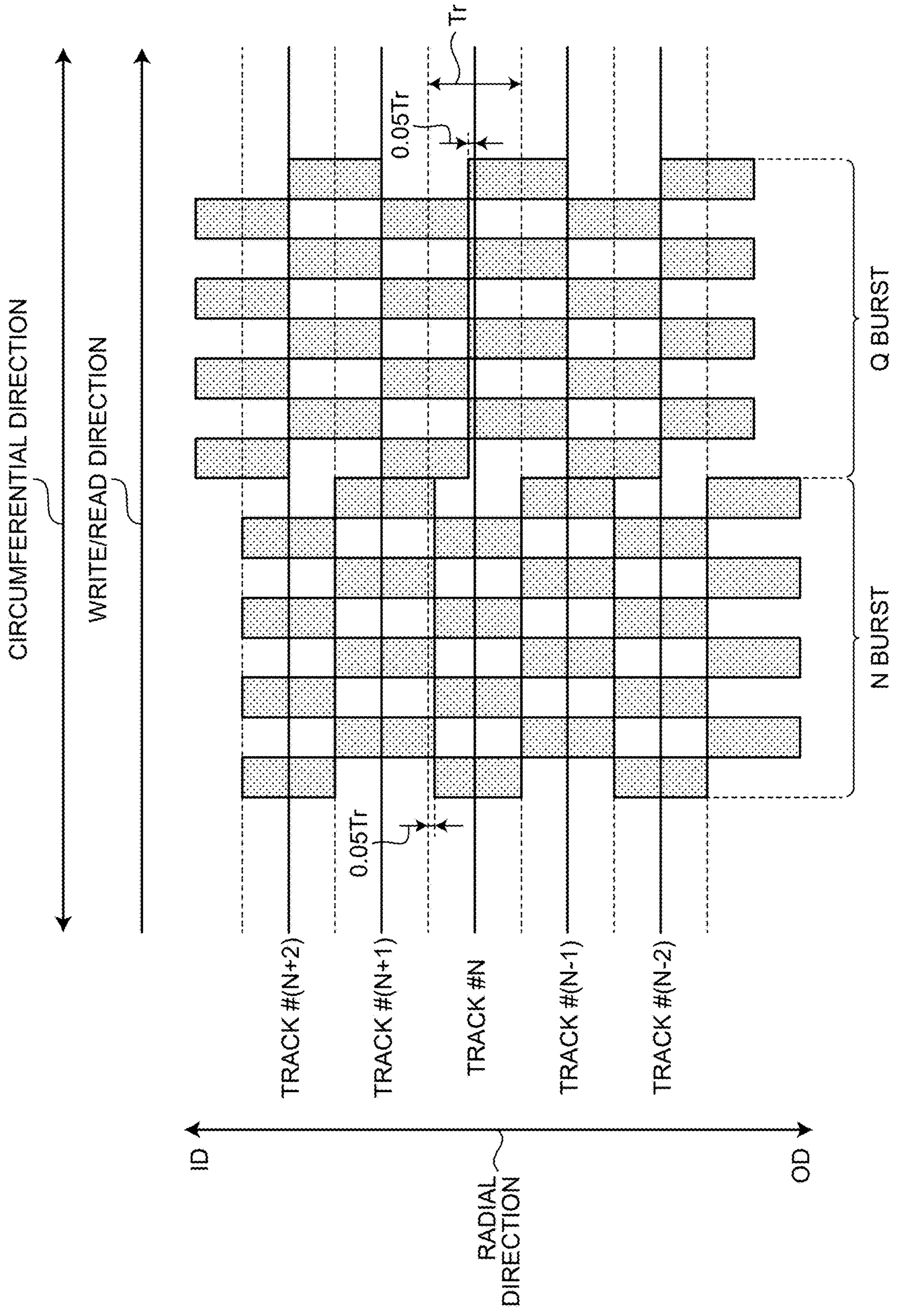
FIG. 22 is a schematic diagram illustrating an example (second example) in which quality of both the N burst and the Q burst is poor.

FIG. 22 is a schematic diagram illustrating an example (second example) in which quality of both the N burst and the Q burst is poor.

The burst pattern configuration according to the second example is different from the burst pattern configuration according to the ideal example illustrated in FIG. 4 in that the edge of the pattern of the N burst to be located at the radial position exactly in the middle between the track #N and the track #(N+1) is shifted to the outer diameter side by 0.05 Tr from the radial position exactly in the middle between the track #N and the track #(N+1), and the edge of the pattern of the N burst to be located at the track center of the track #N is shifted to the inner diameter side by 0.05 Tr from the track center of the track #N. Thus, as compared with the burst pattern configuration according to the ideal example, both the quality of the N burst and the quality of the Q burst are poor.

Figure 23:
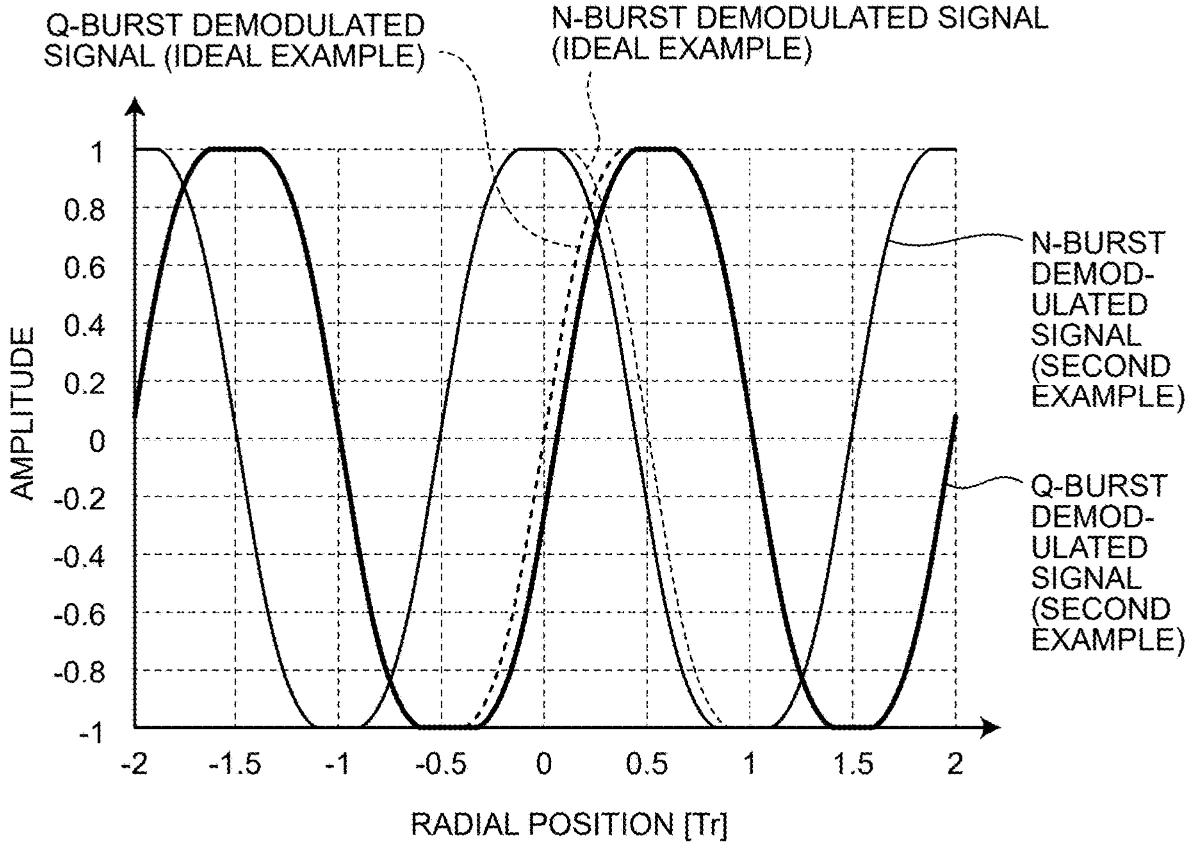
FIG. 23 is a diagram illustrating an example of the relationship between the amplitude of each of the N-burst demodulated signal and the Q-burst demodulated signal and the radial position of the magnetic head according to a second example.

FIG. 23 is a diagram illustrating an example of the relationship between the amplitude of each of the N-burst demodulated signal and the Q-burst demodulated signal and the radial position of the magnetic head 22 according to the second example. In FIG. 23, the horizontal axis indicates a radial position with the track center of a certain track 41 (here, track #N in FIG. 22 as one example) as an origin. The radial position is expressed in units of tracks. The vertical axis indicates the amplitude.

FIG. 23 additionally illustrates the amplitude of each burst demodulated signal in the ideal example for comparison. As illustrated in FIG. 23, an error occurs in the amplitude of the N-burst demodulated signal at the radial position in the range of 0 Tr to 1 Tr due to the edge deviation of the N-burst pattern. In addition, an error occurs in the amplitude of the Q-burst demodulated signal at the radial position in the range of −0.5 Tr to 0.5 Tr due to the edge deviation of the Q-burst pattern.

Figure 24:
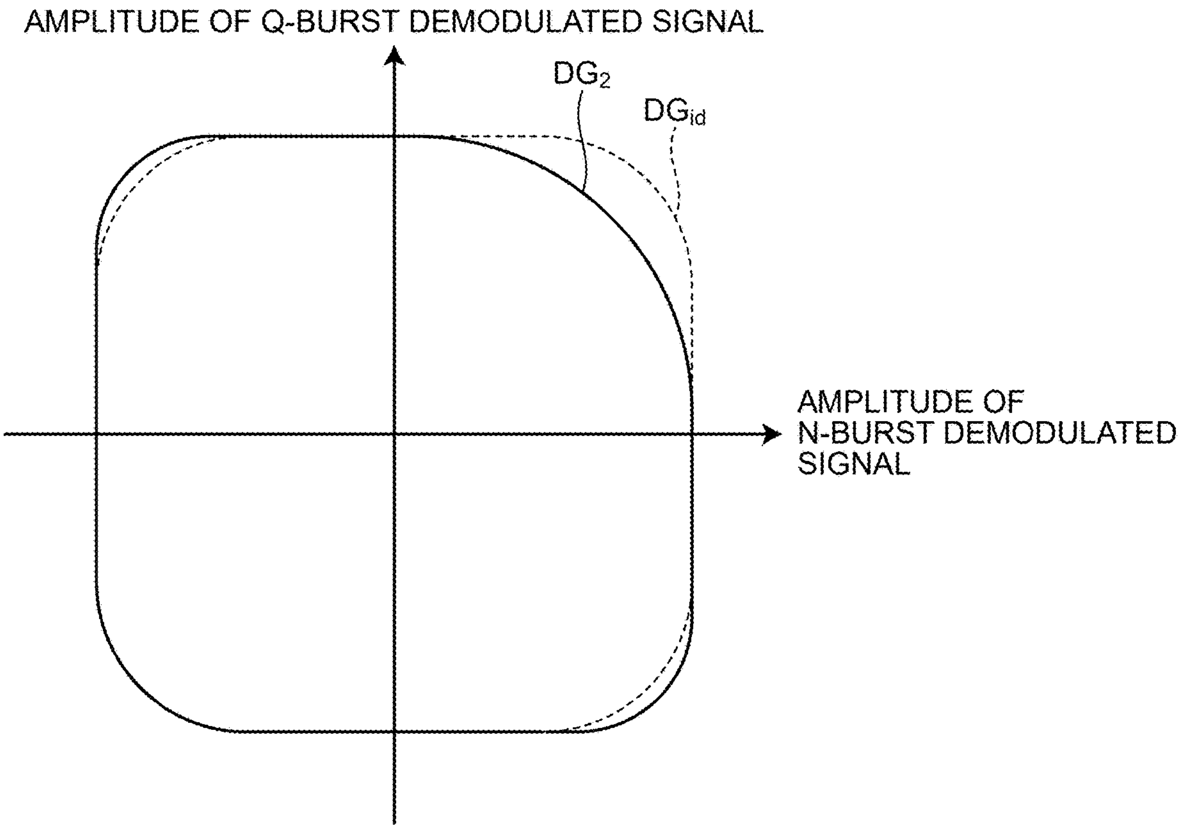
FIG. 24 is a diagram illustrating a Lissajous figure according to the second example.

FIG. 24 is a diagram illustrating a Lissajous figure according to the second example. It can be seen that the Lissajous figure $DG_2$ according to the second example is distorted in the vicinity of the angle θ=45° (degree), in the vicinity of the angle θ=135° (degree), and in the vicinity of the angle θ=315° (degree) as compared with the Lissajous figure $DG_{id}$ according to the ideal example.

Figure 25:
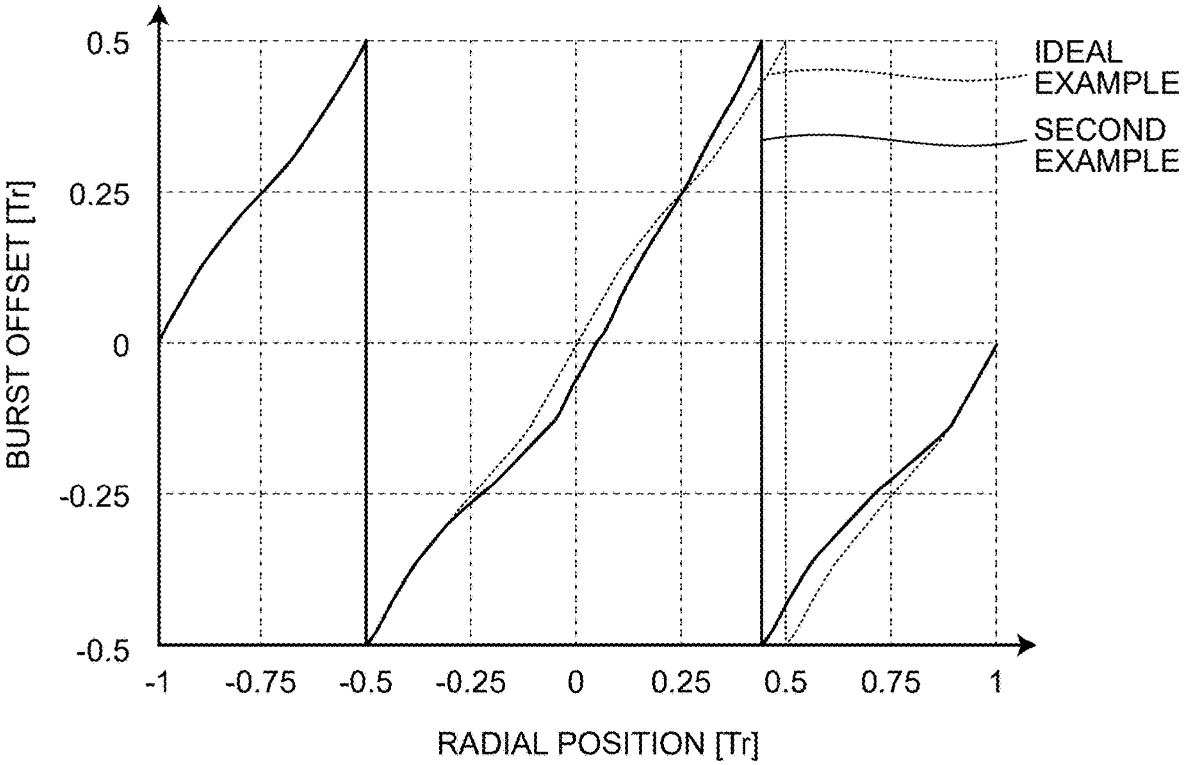
FIG. 25 is a diagram illustrating a relationship between a first demodulation position and a radial position according to the second example.

FIG. 25 is a diagram illustrating a relationship between the first demodulation position and the radial position according to the second example. The horizontal axis indicates a radial position with track #N as an origin. The vertical axis indicates the burst offset. Both the radial position and the burst offset are expressed in units of tracks. From this figure, it can be seen that, according to the second example, an error occurs in the calculated value of the burst offset at a radial position in the range of −0.5 Tr to 0.75 Tr.

Figure 26:
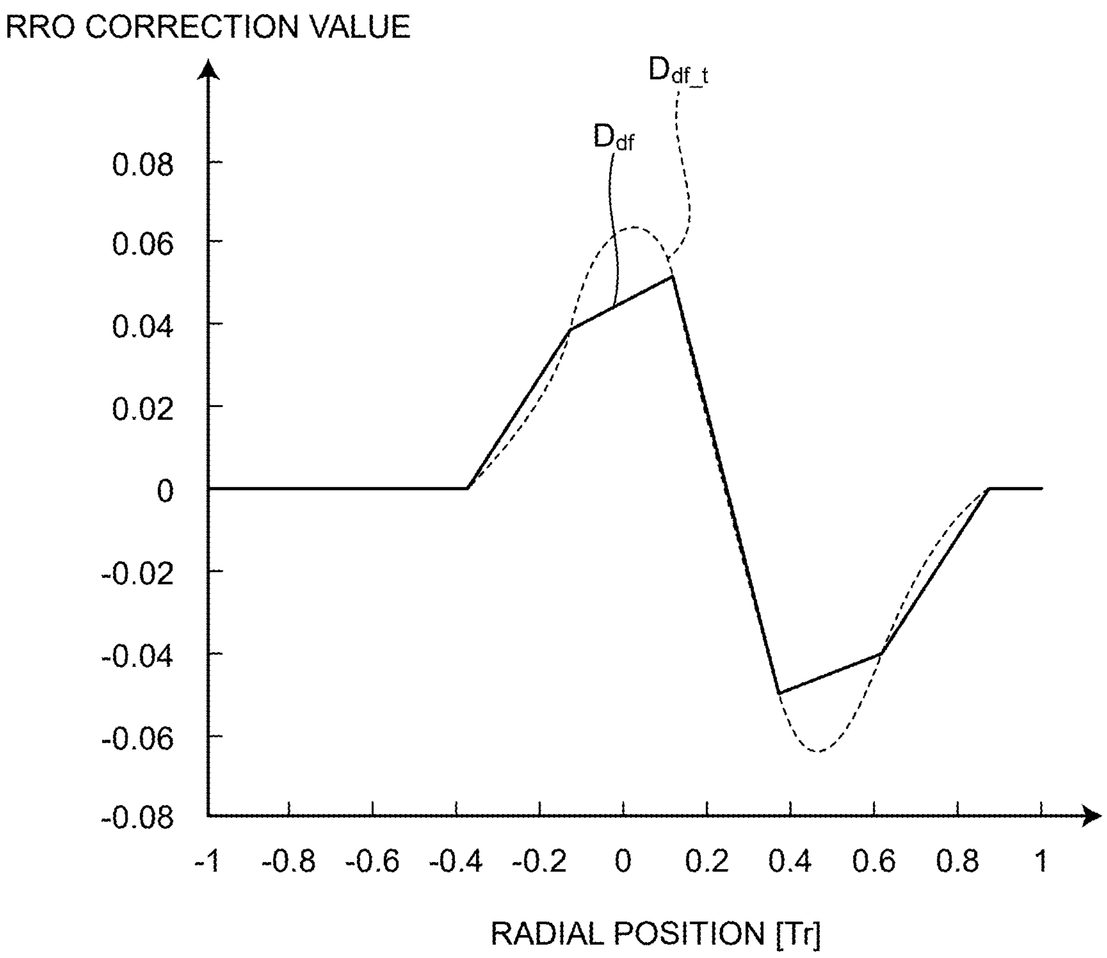
FIG. 26 is a diagram illustrating a relationship between the RRO correction value and the radial position according to the second example in a case the comparative example is applied.

FIG. 26 is a diagram illustrating a relationship between the RRO correction value and the radial position according to the second example in a case the comparative example is applied. The horizontal axis indicates a radial position with track #N as an origin. The vertical axis indicates the RRO correction value. The RRO training positions are ±0.125 Tr, ±0.375 Tr, ±0.625 Tr, and ±0.875 Tr around the radial position 0. For comparison, FIG. 26 illustrates the RRO correction value $D_{df\_t}$ obtained when the RRO is actually trained at each radial position.

As illustrated in FIG. 26, the deviation between the RRO correction value $D_{df}$ and the RRO correction value $D_{df\_t}$ increases in the vicinity of the radial position of 0 Tr between the radial position of −0.125 Tr and the radial position of 0.125 Tr, which are two adjacent RRO training positions. Further, the deviation between the RRO correction value $D_{df}$ and the RRO correction value $D_{df\_t}$ increases in the vicinity of the radial position of 0.5 Tr between the radial position of 0.375 Tr and the radial position of 0.625 Tr, which are two adjacent RRO training positions.

Figure 27:
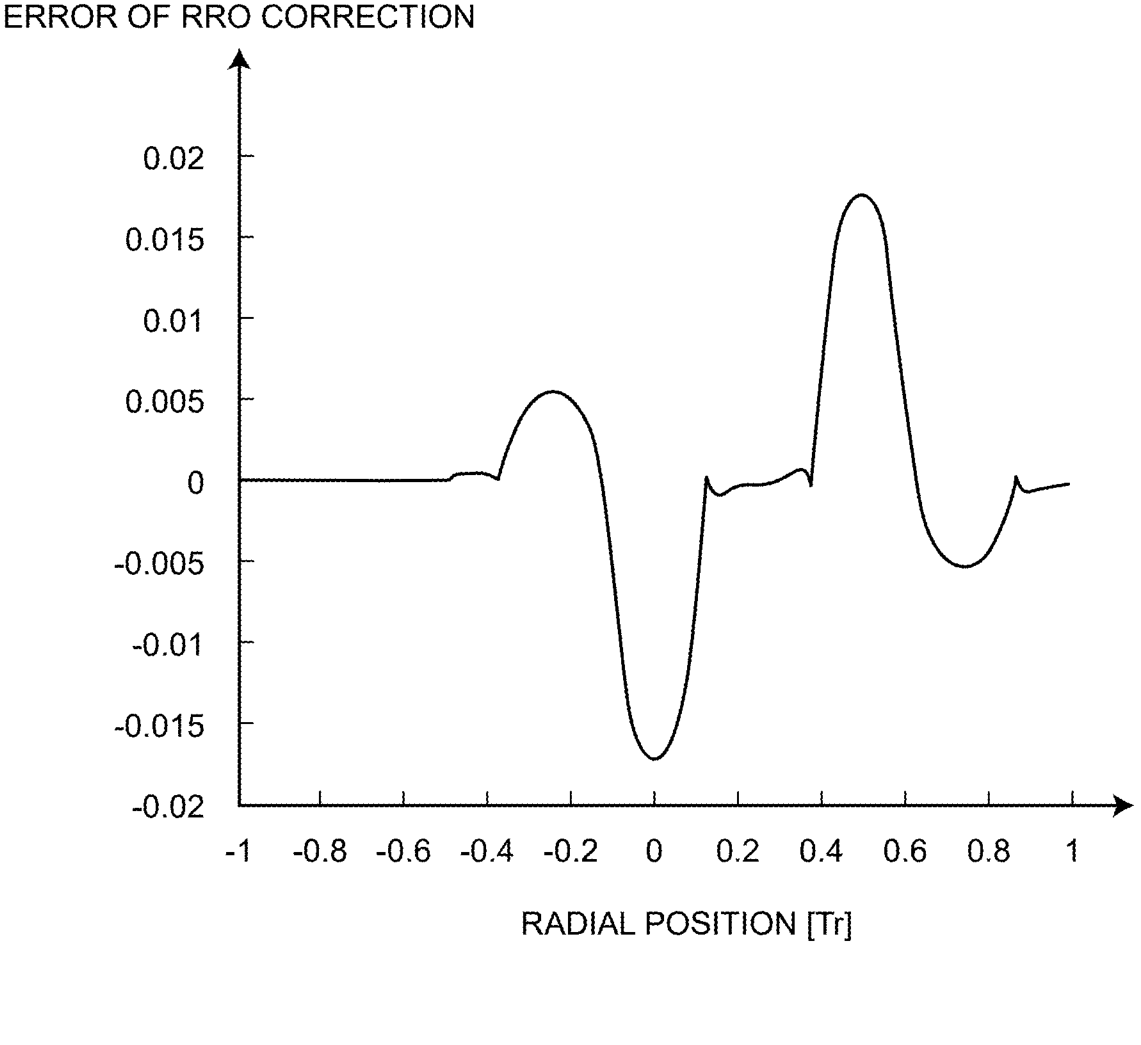
FIG. 27 is a diagram illustrating an error of the RRO correction according to the second example in a case the comparative example is applied.

FIG. 27 is a diagram illustrating an error of the RRO correction according to the second example in a case the comparative example is applied. The horizontal axis indicates a radial position with track #N as an origin. The vertical axis indicates an error of the RRO correction.

As illustrated in FIG. 27, according to the comparative example, the deviation between the RRO correction value $D_{df}$ and the RRO correction value $D_{df\_t}$ is large in the vicinity of the radial position of 0 Tr and in the vicinity of the radial position of 0.5 Tr, and thus, the error of the RRO correction is large.

Figure 28:
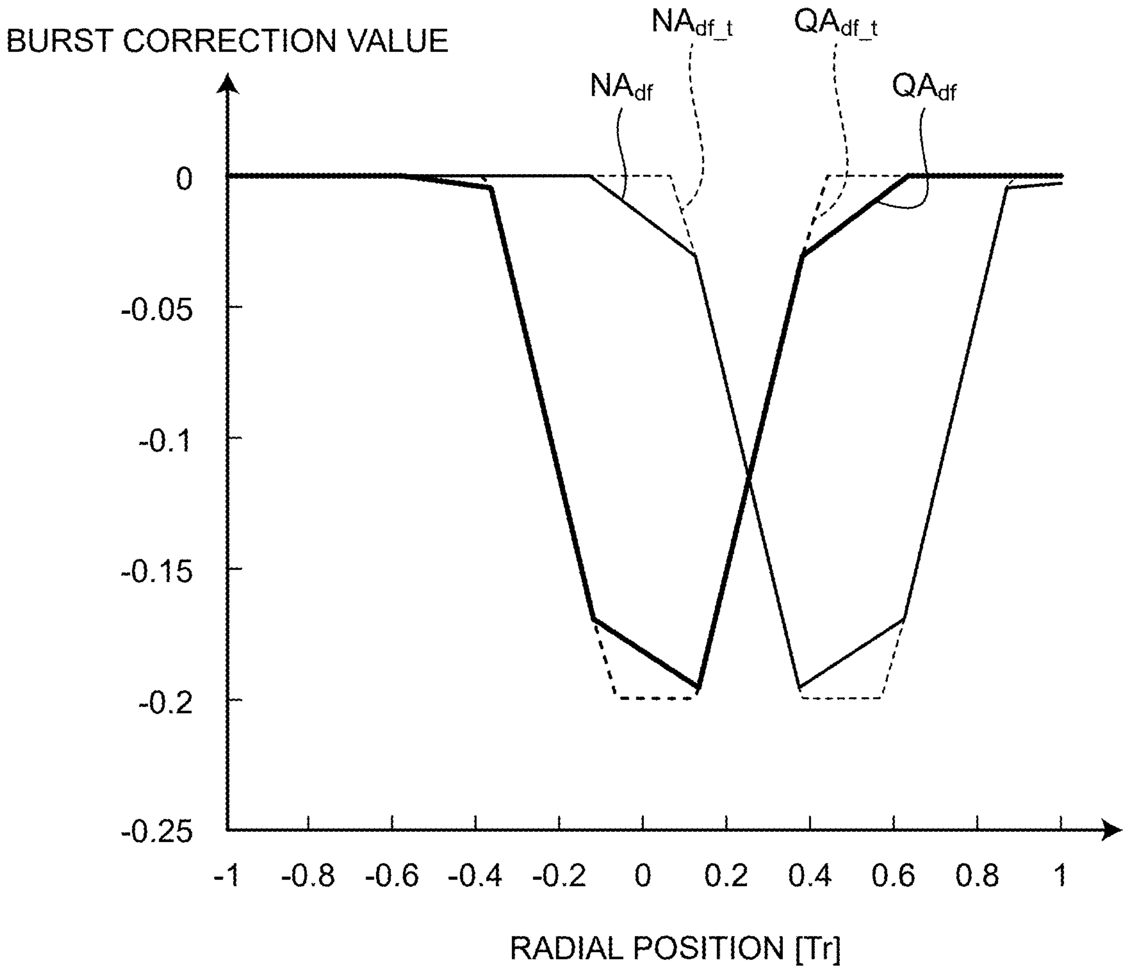
FIG. 28 is a diagram illustrating a relationship between an N-burst correction value and a Q-burst correction value, and a radial position according to the second example in a case where the embodiment is applied.

FIG. 28 is a diagram illustrating a relationship between an N-burst correction value $NA_{df}$ and a Q-burst correction value $QA_{df}$, and a radial position according to the second example in a case where the embodiment is applied. The horizontal axis indicates a radial position with track #N as an origin. The vertical axis indicates each burst correction value. The RRO training positions are ±0.125 Tr, ±0.375 Tr, ±0.625 Tr, and ±0.875 Tr around the radial position 0.

For comparison, FIG. 28 illustrates an N-burst correction value $NA_{df\_t}$ and a Q-burst correction value $QA_{df\_t}$ obtained in a case where the RRO is actually trained at each radial position.

Although each of the N-burst correction value $NA_{df}$ and the Q-burst correction value $QA_{df}$ changes in a polygonal line shape due to interpolation processing, it can be seen that the N-burst correction value $NA_{df}$ is close to the N-burst correction value $NA_{df\_t}$ and the Q-burst correction value $QA_{df}$ is close to the Q-burst correction value $QA_{df\_t}$.

Figure 29:
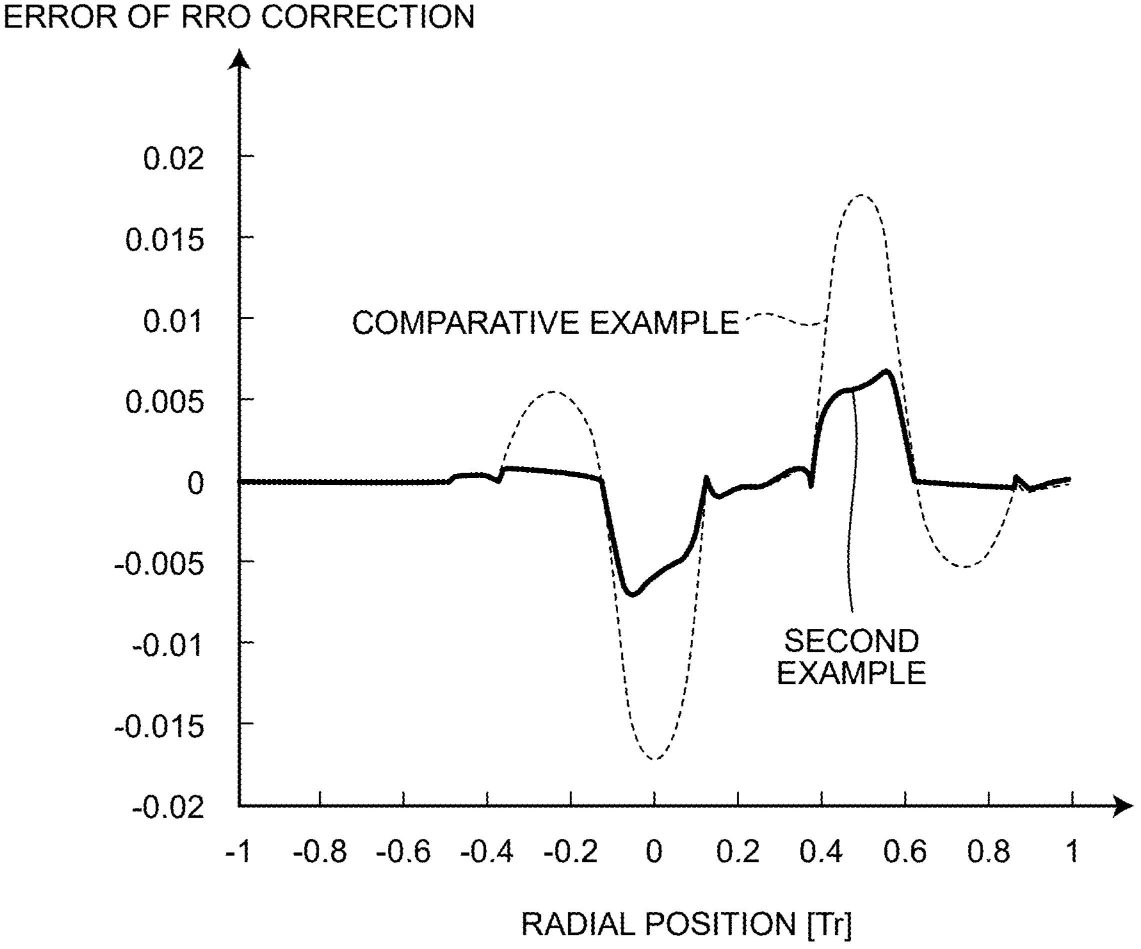
FIG. 29 is a diagram illustrating an effect of the RRO correction according to the second example in a case where the embodiment is applied.

FIG. 29 is a diagram illustrating an effect of the RRO correction according to the second example in a case where the embodiment is applied. The horizontal axis indicates a radial position with track #N as an origin. The vertical axis indicates an error of the RRO correction.

In FIG. 29, a dotted line indicates an error of the RRO correction in a case the comparative example is applied. A solid line indicates an error of the RRO correction in a case where the embodiment is applied. From the drawing, it can be seen that according to the embodiment, the error of the RRO correction is smaller than that of the comparative example. It can be said that the RRO correction can be performed with higher accuracy in the second example than in the comparative example according to the embodiment.

As described above, according to the embodiment, the controller 30 acquires the N-burst correction value and the Q-burst correction value for each of the two points of the RRO training positions (see, for example, S201 in FIG. 14). Then, when the magnetic head 22 passes over the servo region SV (see, for example, S202 in FIG. 14), the controller 30 performs the following processing. The controller 30 acquires an N-burst demodulated signal by demodulating the N burst, and acquires a Q-burst demodulated signal by demodulating the Q burst. The controller 30 calculates a demodulation position (the first demodulation position) of the magnetic head 22 based on the amplitude of the N-burst demodulated signal and the amplitude of the Q-burst demodulated signal (for example, see S203 in FIG. 14). The controller 30 acquires the N-burst correction value at the first demodulation position based on the N-burst correction value of each of the two points of the RRO training positions by interpolation calculation (for example, see S206 in FIG. 14). The controller 30 acquires the Q-burst correction value at the first demodulation position based on the Q-burst correction value of each of the two points of the RRO training positions by interpolation calculation (for example, see S207 in FIG. 14). The controller 30 corrects the amplitude of the N-burst demodulated signal by using the N-burst correction value for the first demodulation position, and corrects the amplitude of the Q-burst demodulated signal by using the Q-burst correction value for the first demodulation position (see, for example, S208 and S209 in FIG. 14). The controller 30 calculates a demodulation position (the second demodulation position) based on the corrected amplitude of the N-burst demodulated signal and the corrected amplitude of the Q-burst demodulated signal (for example, see S210 in FIG. 14). Then, the controller 30 performs positioning control of the magnetic head 22 by using the second demodulation position.

Therefore, it is possible to correct the positional deviation due to the RRO with high accuracy.

According to the embodiment, it has been described that the group of pairs of the N-burst correction value and the Q-burst correction value is written in the FROM 28. The storage area in which a group of pairs of the N-burst correction value and the Q-burst correction value is written is not limited to the FROM 28 as long as it is a nonvolatile storage area. A group of pairs of the N-burst correction value and the Q-burst correction value may be written to the magnetic disk 11.

Moreover, according to the embodiment, the controller 30 executes the operation of acquiring the RRO correction information for each of the RRO training positions in the manufacturing process (for example, see FIG. 11). The controller 30 operates as follows for each RRO training position. First, the controller 30 moves the magnetic head 22 onto one RRO training position (see, for example, S102 in FIG. 11). Then, when the magnetic head 22 passes over the servo region SV, an N-burst demodulated signal (referred to as a first burst demodulated signal) is acquired by demodulating the N burst recorded in the servo region SV, and a Q-burst demodulated signal (referred to as a second burst demodulated signal) is acquired by demodulating the Q burst recorded in the servo region SV. The controller 30 calculates a demodulation position based on the amplitude of the first burst demodulated signal and the amplitude of the second burst demodulated signal (for example, see S103 in FIG. 11). The controller 30 estimates the actual position of the magnetic head 22 based on the demodulation position and the sensitivity function of the positioning control of the magnetic head 22 (see, for example, S104 to S107 in FIG. 11). The controller 30 calculates the amplitude of the third burst demodulated signal and the amplitude of the fourth burst demodulated signal obtained when the magnetic head 22 is at the actual position based on a predetermined Lissajous figure (see, for example, the Lissajous figure $DG_{id2}$ in FIG. 12) in which the amplitude of the N-burst demodulated signal (referred to as a third burst demodulated signal) obtained by demodulating the N burst included in a burst pattern configuration (referred to as a first burst pattern configuration) different from the burst pattern configuration including the N burst and the Q burst recorded in the servo region SV and the amplitude of the Q-burst demodulated signal (referred to as a fourth burst demodulated signal) obtained by demodulating the Q burst included in the first burst pattern configuration are shown in a plane as values of coordinate axes different from each other (see, for example, the point $P_{AC}$ in FIG. 12). Then, the controller 30 acquires an N-burst correction value by calculation of obtaining a difference between the amplitude of the third burst demodulated signal and the amplitude of the first burst demodulated signal, acquires a Q-burst correction value by calculation of obtaining a difference between the amplitude of the fourth burst demodulated signal and the amplitude of the second burst demodulated signal, and records the N-burst correction value and the Q-burst correction value in correlation with the RRO training position (see, for example, S108 and S109 in FIG. 11, and FIG. 12).

As described above, since the RRO correction information is configured by a pair of the correction value of the amplitude of the N-burst demodulated signal and the correction value of the amplitude of the Q-burst demodulated signal at each training position, in the linear RRO correction operation, interpolation can be individually performed for each of the correction value of the amplitude of the N-burst demodulated signal and the correction value of the amplitude of the Q-burst demodulated signal. Since it is possible to individually correct the amplitude of the N-burst demodulated signal and the amplitude of the Q-burst demodulated signal regardless of whether the magnetic head 22 is on the RRO training position, it is possible to correct the positional deviation due to the RRO with high accuracy.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:

a magnetic disk including a track, the magnetic disk being provided with a radial servo region in which servo data including a first burst pattern and a second burst pattern is recorded;

a magnetic head configured to execute write and read on the magnetic disk; and a controller configured to acquire, for each of a first radial position and a second radial position, a first correction value and a second correction value, the first radial position being a position that is radially offset from a track center of the track, the second radial position being a position that is radially offset from the track center and is different from the first radial position, when the magnetic head passes over the servo region, acquire a first burst demodulated signal by demodulating the first burst pattern, acquire a second burst demodulated signal by demodulating the second burst pattern, calculate a first demodulation position of the magnetic head based on amplitude of the first burst demodulated signal and amplitude of the second burst demodulated signal, acquire a first interpolation correction value by interpolating a first correction value for the first demodulation position based on the first correction value acquired for the first radial position and the first correction value acquired for the second radial position, acquire a second interpolation correction value by interpolating a second correction value for the first demodulation position based on the second correction value acquired for the first radial position and the second correction value acquired for the second radial position, correct the amplitude of the first burst demodulated signal by using the first interpolation correction value, correct the amplitude of the second burst demodulated signal by using the second interpolation correction value, calculate a second demodulation position of the magnetic head based on the corrected amplitude of the first burst demodulated signal and the corrected amplitude of the second burst demodulated signal, and perform positioning control using the second demodulation position.

2. The magnetic disk device according to claim 1, further comprising a memory in which the first correction value and the second correction value are written for each of the first radial position and the second radial position, wherein the controller is configured to read, from the memory, the first correction value and the second correction value for each of the first radial position and the second radial position.

3. The magnetic disk device according to claim 1, wherein the first correction value and the second correction value are recorded on the magnetic disk for each of the first radial position and the second radial position, and the controller is configured to read, from the magnetic disk, the first correction value and the second correction value for each of the first radial position and the second radial position.

4. A magnetic disk device comprising:

a magnetic disk including a track, the magnetic disk being provided with a radial servo region in which first servo data including a first burst pattern and a second burst pattern is recorded;

a magnetic head configured to execute write and read on the magnetic disk; and a controller configured to move the magnetic head to a first radial position and a second radial position, the first radial position being a position that is radially offset from a track center of the track, the second radial position being a position that is radially offset from the track center and is different from the first radial position, execute a first operation when the magnetic head is at the first radial position and when the magnetic head is at the second radial position, the first operation including:

acquiring a first burst demodulated signal and a second burst demodulated signal when the magnetic head passes over the servo region, the first burst demodulated signal being acquired by demodulating the first burst pattern included in the first servo data, the second burst demodulated signal being acquired by demodulating the second burst pattern included in the first servo data;

calculating a first demodulation position of the magnetic head based on amplitude of the first burst demodulated signal and amplitude of the second burst demodulated signal;

estimating an actual position of the magnetic head based on the first demodulation position and a sensitivity function of positioning control of the magnetic head;

estimating amplitude of a third burst demodulated signal and amplitude of a fourth burst demodulated signal, each amplitude being obtained when the magnetic head is at the actual position and being estimated based on a Lissajous figure in which the amplitude of the third burst demodulated signal obtained by demodulating the first burst pattern included in the first servo data and the amplitude of the fourth burst demodulated signal obtained by demodulating the second burst pattern included in the first servo data at various radial positions are indicated on a plane as values of coordinate axes different from each other; and recording a first difference and a second difference in association with a third radial position, the first difference being a difference between the amplitude of the third burst demodulated signal and the amplitude of the first burst demodulated signal, the second difference being a difference between the amplitude of the fourth burst demodulated signal and the amplitude of the second burst demodulated signal, the third radial position being one of the first radial position and the second radial position at which the magnetic head is positioned when the first operation is executed, execute a second operation when the magnetic head passes over the servo region after the first operation is completed for each of the first radial position and the second radial position, the second operation including:

acquiring a fifth burst demodulated signal by demodulating the first burst pattern included in the first servo data;

acquiring a sixth burst demodulated signal by demodulating the second burst pattern included in the first servo data;

calculating a second demodulation position of the magnetic head based on amplitude of the fifth burst demodulated signal and amplitude of the sixth burst demodulated signal;

acquiring, for the second demodulation position, a first interpolation difference by interpolating between the first difference associated with the first radial position and the first difference associated with the second radial position;

acquiring, for the second demodulation position, a second interpolation difference by interpolating between the second difference associated with the first radial position and the second difference associated with the second radial position;

correcting the amplitude of the fifth burst demodulated signal by using the first interpolation difference;

correcting the amplitude of the sixth burst demodulated signal by using the second interpolation difference; and calculating a third demodulation position of the magnetic head based on the corrected amplitude of the fifth burst demodulated signal and the corrected amplitude of the sixth burst demodulated signal, and perform positioning control using the third demodulation position.

5. The magnetic disk device according to claim 4, further comprising a memory, wherein the controller is configured to record the first difference and the second difference in the memory for each of the first radial position and the second radial position, and read, in the second operation, the first difference and the second difference from the memory for each of the first radial position and the second radial position.

6. The magnetic disk device according to claim 4, wherein the controller is configured to write the first difference and the second difference in the magnetic disk for each of the first radial position and the second radial position, and read, in the second operation, the first difference and the second difference from the magnetic disk for each of the first radial position and the second radial position.

7. A method comprising:

moving a magnetic head to a first radial position and a second radial position on a magnetic disk including a track, the magnetic disk being provided with a radial servo region in which first servo data including a first burst pattern and a second burst pattern is recorded, the first radial position being a position that is radially offset from a track center of the track, the second radial position being a position that is radially offset from the track center and is different from the first radial position; and executing a first operation when the magnetic head is at the first radial position and when the magnetic head is at the second radial position, the first operation including:

acquiring a first burst demodulated signal and a second burst demodulated signal when the magnetic head passes over the servo region, the first burst demodulated signal being acquired by demodulating the first burst pattern included in the first servo data, the second burst demodulated signal being acquired by demodulating the second burst pattern included in the first servo data;

calculating a first demodulation position of the magnetic head based on amplitude of the first burst demodulated signal and amplitude of the second burst demodulated signal;

estimating an actual position of the magnetic head based on the first demodulation position and a sensitivity function of positioning control of the magnetic head;

estimating amplitude of a third burst demodulated signal and amplitude of a fourth burst demodulated signal, each amplitude being obtained when the magnetic head is at the actual position and being estimated based on a Lissajous figure in which the amplitude of the third burst demodulated signal obtained by demodulating the first burst pattern included in the first servo data and the amplitude of the fourth burst demodulated signal obtained by demodulating the second burst pattern included in the first servo data at various radial positions are indicated on a plane as values of coordinate axes different from each other; and recording a first difference and a second difference in association with a third radial position, the first difference being a difference between the amplitude of the third burst demodulated signal and the amplitude of the first burst demodulated signal, the second difference being a difference between the amplitude of the fourth burst demodulated signal and the amplitude of the second burst demodulated signal, the third radial position being one of the first radial position and the second radial position at which the magnetic head is positioned when the first operation is executed.

8. The method according to claim 7, further comprising:
executing a second operation when the magnetic head passes over the servo region after the first operation is completed for each of the first radial position and the second radial position, the second operation including:
acquiring a fifth burst demodulated signal by demodulating the first burst pattern included in the first servo data;
acquiring a sixth burst demodulated signal by demodulating the second burst pattern included in the first servo data;
calculating a second demodulation position of the magnetic head based on amplitude of the fifth burst demodulated signal and amplitude of the sixth burst demodulated signal;
acquiring, for the second demodulation position, a first interpolation difference by interpolating between the first difference associated with the first radial position and the first difference associated with the second radial position;
acquiring, for the second demodulation position, a second interpolation difference by interpolating between the second difference associated with the first radial position and the second difference associated with the second radial position;
correcting the amplitude of the fifth burst demodulated signal by using the first interpolation difference;
correcting the amplitude of the sixth burst demodulated signal by using the second interpolation difference; and
calculating a third demodulation position of the magnetic head based on the corrected amplitude of the fifth burst demodulated signal and the corrected amplitude of the sixth burst demodulated signal; and
performing positioning control using the third demodulation position.

9. The method according to claim 8, wherein
executing the first operation includes recording the first difference and the second difference in a memory for each of the first radial position and the second radial position, and
executing the second operation includes reading the first difference and the second difference from the memory for each of the first radial position and the second radial position.

10. The method according to claim 8, wherein
executing the first operation includes recording the first difference and the second difference in the magnetic disk for each of the first radial position and the second radial position, and
executing the second operation includes reading the first difference and the second difference from the magnetic disk for each of the first radial position and the second radial position.

* * * * *